United States Patent
Acker et al.

(10) Patent No.: US 12,253,989 B2
(45) Date of Patent: Mar. 18, 2025

(54) VERSIONED RELATIONAL DATASET MANAGEMENT

(71) Applicant: HUAWEI TECHNOLOGIES CO., LTD., Shenzhen (CN)

(72) Inventors: Ralph Acker, Munich (DE); David Dominguez, Munich (DE)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/336,743

(22) Filed: Jun. 16, 2023

(65) Prior Publication Data
US 2023/0334031 A1    Oct. 19, 2023

Related U.S. Application Data

(63) Continuation of application No. PCT/EP2020/086832, filed on Dec. 17, 2020.

(51) Int. Cl.
  *G06F 16/21*   (2019.01)
  *G06F 16/22*   (2019.01)
  *G06F 16/23*   (2019.01)

(52) U.S. Cl.
  CPC ........ *G06F 16/219* (2019.01); *G06F 16/2237* (2019.01); *G06F 16/2358* (2019.01); *G06F 16/2393* (2019.01)

(58) Field of Classification Search
  CPC .............. G06F 16/219; G06F 16/2237; G06F 16/2358; G06F 16/2393
  See application file for complete search history.

(56) References Cited

U.S. PATENT DOCUMENTS

| | | | |
|---|---|---|---|
| 2016/0070726 A1* | 3/2016 | MacNicol | G06F 11/0745 707/691 |
| 2016/0085834 A1* | 3/2016 | Gleeson | G06F 16/273 707/693 |
| 2017/0206233 A1* | 7/2017 | Lu | G06F 16/219 |
| 2020/0034365 A1* | 1/2020 | Martin | G06F 16/24554 |
| 2020/0125549 A1* | 4/2020 | Hoang | G06F 16/2358 |
| 2021/0334169 A1* | 10/2021 | Chopra | G06F 16/27 |
| 2022/0121523 A1* | 4/2022 | Upadhyay | G06F 11/1448 |

* cited by examiner

*Primary Examiner* — Dangelino N Gortayo
(74) *Attorney, Agent, or Firm* — Leydig, Voit & Mayer, Ltd.

(57) ABSTRACT

A versioned dataset is managed. An updated versioned dataset is created by applying a structured query to a specific version of multiple versions of the versioned dataset stored in the backing dataset. Data of the versions including the specific version remain unchanged. A versioned dataset catalogue is updated to include in association with the updated dataset version, the structured query and lineage indicating that the updated versioned dataset includes a successor of the specific version. An affiliation encoding associated with the updated versioned dataset indicating which data of the updated versioned dataset matches data of the specific version and which data of the updated versioned dataset is deleted relative to data of the specific version, is updated. A database view of the updated versioned dataset is generated by selecting rows and projecting columns of the backing dataset corresponding to the updated versioned dataset according to the affiliation encoding.

22 Claims, 12 Drawing Sheets

VERSIONED RELATIONAL DATASET MANAGEMENT

CROSS-REFERENCE TO RELATED APPLICATIONS

This application is a continuation of International Application No. PCT/EP2020/086832, filed on Dec. 17, 2020, the disclosure of which is hereby incorporated by reference in its entirety.

BACKGROUND

The present disclosure, in some embodiments thereof, relates to datasets stored in relational databases and, more in particular to storing multiple versions of datasets in the relational database.

Relational databases store data in rows and columns. Queries may be made against the relational database, for example, adding new rows, adding new columns, removing existing rows, removing existing columns, changing values, intersection operations, union operations, and the like.

SUMMARY

According to a first aspect, an apparatus for managing a versioned dataset, comprises: a processor and a non-transitory storage medium, the non-transitory storage medium carrying information which, when executed by the processor, cause the processor to: receive at least one structured query indicating instructions for manipulating data of a specific version, the specific version is out of a plurality of versions comprised by the versioned dataset, wherein the versioned dataset is stored in a backing dataset, create, in the backing dataset, an updated versioned dataset by applying the at least one structured query to the specific version, store the updated versioned dataset in the backing dataset, wherein data of the plurality of versions including the specific version remain unchanged, update a versioned dataset catalogue to include in association with the updated dataset version, the at least one structured query and lineage indicating that the updated versioned dataset includes a successor of the specific version, wherein the versioned dataset catalogue includes historical chronologically applied structured queries and lineage for each of the plurality of versions, update an affiliation encoding associated with the updated versioned dataset indicating which data of the updated versioned dataset matches data of the specific version and which data of the updated versioned dataset is deleted relative to data of the specific version, and generate a database view of the updated versioned dataset by selecting rows and projecting columns of the backing dataset corresponding to the updated versioned dataset according to the affiliation encoding.

The versioned dataset stores multiple versions of a dataset in an efficient manner, using a smaller amount of memory and/or storage space for storing the different versions. Each of the multiple versions is fully accessible, and structured query operations may be performed thereon.

According to a second aspect, a method for managing a versioned dataset, comprises: receiving at least one structured query indicating instructions for manipulating data of a specific version, the specific version is out of a plurality of versions comprised by the versioned dataset, wherein the versioned dataset is stored in a backing dataset, creating, in the backing dataset, an updated versioned dataset by applying the at least one structured query to the specific version, storing the updated versioned dataset in the backing dataset, wherein data of the plurality of versions including the specific version remain unchanged, updating a versioned dataset catalogue to include in association with the updated versioned dataset, the at least one structured query and lineage indicating that the updated versioned dataset includes a successor of the specific version, wherein the versioned dataset catalogue includes historical chronologically applied structured queries and lineage for each of the plurality of versions, updating an affiliation encoding associated with the updated versioned dataset indicating which data of the updated versioned dataset matches data of the specific version and which data of the updated versioned dataset is deleted relative to data of the specific version, and generating a database view of the updated versioned dataset by selecting rows and projecting columns of the backing dataset corresponding to the updated versioned dataset according to the affiliation encoding.

According to a third aspect, a computer program product for a versioned dataset, comprising non-transitory medium storing a computer program which, when executed by at least one hardware processor, cause the at least one hardware processor to perform: receiving at least one structured query indicating instructions for manipulating data of a specific version, the specific version is out of a plurality of versions comprised by the versioned dataset, wherein the versioned dataset is stored in a backing dataset, creating, in the backing dataset, an updated versioned dataset by applying the at least one structured query to the specific version, storing the updated versioned dataset in the backing dataset, wherein data of the plurality of versions including the specific version remain unchanged, updating a versioned dataset catalogue to include in association with the updated dataset version, the at least one structured query and lineage indicating that the updated versioned dataset includes a successor of the specific version, wherein the versioned dataset catalogue includes historical chronologically applied structured queries and lineage for each of the plurality of versions, updating an affiliation encoding associated with the updated versioned dataset indicating which data of the updated versioned dataset matches data of the specific version and which data of the updated versioned dataset is deleted relative to data of the specific version, and generating a database view of the updated versioned dataset by selecting rows and projecting columns of the backing dataset corresponding to the updated versioned dataset according to the affiliation encoding.

According to a fourth aspect, an apparatus for managing a versioned dataset, comprising: a processor configured to: receive at least one structured query indicating instructions for manipulating data of a specific version, the specific version is out of a plurality of versions comprised by the versioned dataset, wherein the versioned dataset is stored in a backing dataset, create, in the backing dataset, an updated versioned dataset by applying the at least one structured query to the specific version, store the updated versioned dataset in the backing dataset, wherein data of the plurality of versions including the specific version remain unchanged, update a versioned dataset catalogue to include in association with the updated dataset version, the at least one structured query and lineage indicating that the updated versioned dataset includes a successor of the specific version, wherein the versioned dataset catalogue includes historical chronologically applied structured queries and lineage for each of the plurality of versions, update an affiliation encoding associated with the updated versioned dataset indicating which data of the updated versioned dataset matches data of the specific version and which data of the updated versioned dataset is deleted relative to data of the specific version, and generate a database view of the updated versioned dataset by selecting rows and projecting columns of the backing dataset corresponding to the updated versioned dataset according to the affiliation encoding.

In a further implementation form of the first, second, third, and fourth aspects, the backing dataset is implemented as a table including rows and columns, wherein an original version of the versioned dataset is stored in its entirety, wherein subsequent versions of the versioned dataset are stored as incremental manipulations to preceding version by storing incremental rows and/or columns and by storing an indication of manipulations to the preceding version in the metadata of the versioned dataset catalogue associated with the subsequent version.

The architecture of the backing dataset provides storage efficiency, by using a single table and storing incremental changes to the original and/or previous versions, for example, rather than by separately storing each version.

In a further implementation form of the first, second, third, and fourth aspects, the backing dataset comprises a single backing dataset that stores the plurality of versions of the versioned dataset.

In a further implementation form of the first, second, third, and fourth aspects, further comprising information for compressing the single backing dataset including default values indicating deleted data.

In a further implementation form of the first, second, third, and fourth aspects, the affiliation encoding indicates which rows and/or columns of the updated versioned dataset match rows and/or columns of the specific version, and which rows and/or columns of the updated versioned dataset are deletions relative to the specific version.

In a further implementation form of the first, second, third, and fourth aspects, the affiliation encoding is implemented as a bitmap, wherein in response to a new row and/or column being added to the updated versioned dataset, the affiliation encoding bitmap includes Boolean values for each respective row set to TRUE iff (if and only if) that respective row participates in the updated versioned dataset and to FALSE otherwise.

The bitmap is a highly efficient data structure (e.g., in terms of storage requirements and/or processing requirements) for indicating which rows and/or columns belong to which version.

In a further implementation form of the first, second, third, and fourth aspects, the backing dataset stores a plurality of default values indicating a mapping to values stored in a preceding version.

The default values (e.g., null values) may be compressed with high efficiency, reducing storage requirements in comparison to storage of redundant values.

In a further implementation form of the first, second, third, and fourth aspects, the information refer to a code comprising an add-on extension and/or an application programming interface (API) connected a relational database management system (RDBMS) that manages the versioned dataset.

Traditional RDBMS systems do not provide access to historic data and/or do not store multiple versions of the versioned dataset. The add-on and/or API enhances an existing RDBMS by providing extended features of storing historic data and/or storing multiple versions of the versioned dataset. The RDBMS is extended with code (e.g., dataset versioning extension code) with an API allowing users to collaboratively create, manipulate and track versioned datasets.

In a further implementation form of the first, second, third, and fourth aspects, metadata stored in the versioned dataset catalogue is shared and readable by a plurality of users designated with access to the versioned dataset, wherein concurrent operations for creating and/or revising the plurality of versions of the versioned dataset requested by the plurality of users on the versioned dataset are encapsulated as transactions.

The encapsulation allows multiple users to create and/or revise versioned datasets atomically, where concurrent users cannot access nor affect intermediate steps of dataflow of the versioned datasets.

In a further implementation form of the first, second, third, and fourth aspects, the lineage of the respective version stored in the versioned dataset catalogue denotes dependencies between the plurality of versions of the versioned dataset and is selected from a group consisting of: direct ancestor of the respective version, one of multiple ancestors to a preceding version, a root ancestor indicating a first version with no preceding versions, and a direct ancestor of two or more versions that are merged.

In a further implementation form of the first, second, third, and fourth aspects, the database view stores a mapping indicating a calculation of columns and/or rows of the updated versioned dataset from columns and/or rows of one or more preceding versions, wherein the view of the updated versioned dataset defines instructions for applying the calculations to the columns and/or rows of the one or more preceding versions according to the mapping.

Mapping may be used in the form of column and/or row calculations, for example, avoiding column name collisions in backing datasets that will potentially store data for multiple dataset versions with possibly overlapping and conflicting column names. In some implementations, an internal, canonical naming scheme for backing dataset columns is used (e.g. f0, f1, . . . ). The mapping may be provided, for example, to original user-provided column names, as defined by the initial structured query, within the view definition.

In a further implementation form of the first, second, third, and fourth aspects, the calculation includes one or more members selected from a group consisting of: renaming, negation, type cast, addition, concatenation, coalesce, arbitrary unary and n-ary mappings available in an RDBMS, and user-defined mappings.

The calculations may be defined by the host RDBMS, providing compatibility with, and/or enabling use of existing RDBMS.

In a further implementation form of the first, second, third, and fourth aspects, further comprising information which, when executed by the processor, cause the processor to: re-execute the historical chronologically applied structured queries stored in the versioned dataset catalogue for creating an updated version of the specific version of the plurality of versions of the versioned dataset from current live data, store the updated version in the versioned dataset, and update the versioned dataset catalogue with an indication of the lineage and re-execution for the updated version.

The refresh operation may serve at a later point to create a 'more recent' version of the original (or other lineage) versioned dataset from the current state of the live data (or other updated data).

In a further implementation form of the first, second, third, and fourth aspects, the at least one structured query includes instructions for inserting a new row and/or new column into the specific version, the backing dataset is updated to include the new row and/or new column, and the affiliation encoding is updated to indicate that the new row and/or new column are associated with the updated versioned dataset, wherein the new row and/or new column are un-associated with other versions.

Storage efficiency is provided by storing the incremental new data for the updated versioned dataset, rather than by storing the entire updated versioned dataset. Older versions are unaffected, and are maintained using the metadata.

In a further implementation form of the first, second, third, and fourth aspects, the view of the updated versioned dataset created by selecting rows and projecting columns of the backing dataset corresponding to the updated versioned dataset includes the new row and/or new column.

In a further implementation form of the first, second, third, and fourth aspects, the at least one structured query includes instructions for deleting a row and/or column from the specific version, the versioned dataset catalogue is updated to indicate that the row and/or column of the specific version is excluded from the updated versioned dataset, wherein the row and/or column is non-deleted in the backing dataset and the affiliation encoding is updated to indicate that the deleted row and/or deleted column is un-associated with the updated versioned dataset, wherein the deleted row and/or deleted column remains associated with other versions.

The actual data of the deled row and/or column is maintained in the backing table when previous versions of the dataset are accessed.

In a further implementation form of the first, second, third, and fourth aspects, the view of the updated versioned dataset created by selecting rows and projecting columns of the backing dataset corresponding to the updated versioned dataset excludes the deleted row and/or column.

In a further implementation form of the first, second, third, and fourth aspects, the at least one structured query includes instructions for changing a values in a row and/or column for the specific version, copying the row and/or column affected by the changing value, updating the backing dataset to include the copy, performing the changing of the value on the copy, updating the affiliation encoding to indicate that the copy with changing of the value is associated with the updated versioned dataset, wherein the copy with the changing of the value is un-associated with other versions.

In a further implementation form of the first, second, third, and fourth aspects, unchanged values in the copy associated with the updated versioned dataset are stored as a default value indicating a mapping to corresponding data stored in the specific version, wherein the view of the updated versioned dataset is presented by substituting the default values with the corresponding data according to the mapping.

In a further implementation form of the first, second, third, and fourth aspects, further comprising information which, when executed by the processor, cause the processor to detect orphaned rows and/or columns in the backing dataset that are un-associated with any of the plurality of versions, and automatically remove the orphaned rows and/or columns from the backing dataset.

Removing the orphaned rows and/or columns increased storage efficiency by removing data that is not used by any versions of the versioned dataset.

In a further implementation form of the first, second, third, and fourth aspects, further comprising information which, when executed by the processor, cause the processor to: analyze a configuration parameter indicating a trade-off between storage costs and access costs of one or more of the plurality of versions and the updated versioned dataset, and creating a new backing dataset for one or more versions for which the configuration parameter indicates a lower cost for storage than for access.

The nesting of the previous versions may lead to scan performance degradation and/or higher costs of data extraction of individual versions from the backing dataset. The individual version is stored in a new backing dataset for improved access and/or storage performance.

In a further implementation form of the first, second, third, and fourth aspects, further comprising information which, when executed by the processor, cause the processor to: translate the at least one structured query into an abstract syntax tree (AST), manipulate the AST by substituting attribute references to obtain a manipulated AST, convert the manipulated AST to a rewritten structured query, and apply the rewritten structured query to the backing dataset.

The translation, manipulation, and conversion of the structured query provides compatibility with the RDBMS that manages the backing dataset, by enabling a user to transparently use standard queries such as SQL to manipulate the specific version which is stored in the backing dataset instead.

In a further implementation form of the first, second, third, and fourth aspects, further comprising information which, when executed by the processor, cause the processor to: prepare the view and/or the backing dataset using rewrite rules for processing at least one structured query to manipulate the updated versioned dataset, apply the at least one structured query to the view and/or the backing dataset of the current version to manipulate the updated versioned dataset.

The translation uses an implicit rewrite, without manipulating the AST to obtain the manipulated AST, and without converting the manipulated AST to the rewrite structured query. The user queries are directly applied to the view, and the backing table and versioned dataset catalogue are updated according to the rewrite rule.

In a further implementation form of the first, second, third, and fourth aspects, further comprising information which, when executed by the processor, cause the processor to: select one of the plurality of versions stored in the backing dataset, verify that the selected version has no depended versions, apply at least one structured query to the selected version, update the metadata of versioned dataset catalogue associated with the selected version to further include the applied at least one structured query to existing historical chronologically applied structured queries, and update the view of the selected version according to the applied at least one structured query.

Existing datasets may be amended, rather than creating a new version.

In a further implementation form of the first, second, third, and fourth aspects, wherein: the at least one structured query includes instructions for sampling and/or partitioning at least one subset of the specific version, create comprises creating the updated versioned dataset that includes the at least one subset, wherein the versioned catalogue for the updated versioned dataset includes lineage indicating that the at least one subset of the updated versioned dataset is derived from the specific version.

The sampled dataset may be used, for example, for creating different datasets for training and/or validation of ML models.

In a further implementation form of the first, second, third, and fourth aspects, wherein: the at least one structured query includes instructions for shuffling data of the specific version, create comprises creating the updated versioned dataset that includes the shuffled data, wherein the shuffled data is implemented as at least one of: a mapping of data of the specific version to a new order of the updated versioned dataset, and a copy of data of the specific version to the new order of the updated versioned dataset, wherein the versioned catalogue for the updated versioned dataset includes lineage indicating that the updated versioned dataset with shuffled data is derived from the specific version, and indicates instructions for shuffling of the data of the specific version to create the updated versioned dataset, wherein the affiliation mapping stores the new order of the updated versioned dataset.

The shuffled dataset may be used, for example, for creating different datasets for training and/or validation of ML models.

In a further implementation form of the first, second, third, and fourth aspects, further comprising information which, when executed by the processor, cause the processor to: receive instructions for purging the specific version, delete data exclusive to the specific version and non-existent in any dependent dataset deriving from the specific version, from the backing dataset, delete metadata exclusive to the specific version and non-existent in any dependent dataset deriving from the specific version, from the versioned dataset catalogue, and update the metadata of the versioned dataset catalogue for any dependent dataset deriving from the specific version, by changing dependencies from the purged version to an earlier version from which the purged version depends from.

The purge operation may attempt to free occupied storage capacity of the purged dataset, while leaving integrity (e.g., data and history) of possible dependent versioned datasets intact and unaffected.

In a further implementation form of the first, second, third, and fourth aspects, further comprising information which, when executed by the processor, cause the processor to: receive instructions for merging a first version with a second version, the first version and the second version derived from a common ancestor version, creating a merged set of manipulation operations by integrating manipulation operations applied to the first version with manipulation operations applied to the second version, applying the merged set of manipulation operations to the common ancestor version, storing in the metadata of the versioned dataset catalogue associated with the updated versioned dataset, lineage indicating derivation from the first version and the second version and the merged set of manipulation operations.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
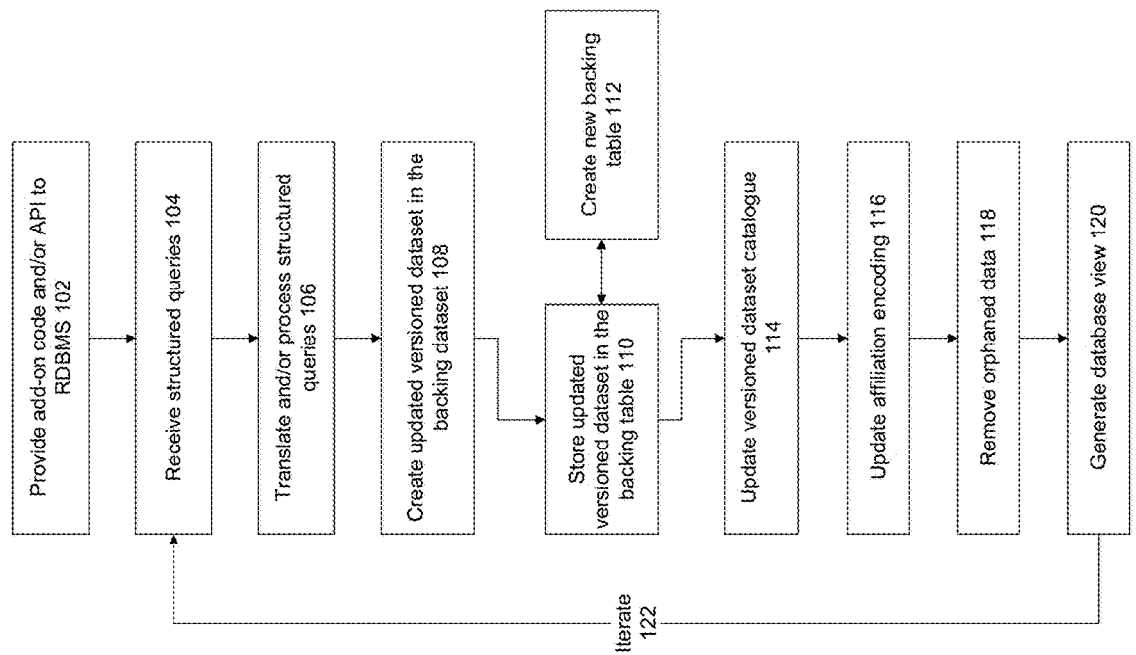
FIG. 1 is a flowchart of a method of managing a versioned dataset, in accordance with some embodiments.

The present disclosure, in some embodiments thereof, relates to datasets stored in relational databases and, more specifically, but not exclusively, to storing multiple versions of datasets in the relational database.

At least some implementations of the systems, methods, apparatus, processor, and/or code instructions (also referred to as information) manage a backing dataset that includes multiple versions of a versioned dataset, optionally in a single dataset, for example, a table. A specific version of the multiple versions may be manipulated by one or more structured queries. The structured queries include instructions to manipulate structured data stored in a structured dataset, i.e., the backing dataset, for example, insert row, delete row, add two columns together and provide the output into a third column, and change a value in a certain cell. An updated versioned dataset is created in the backing dataset by applying the one or more structured queries to the specific version. The specific version is a parent, and the new version created by applying the one or more structured queries to the specific version is a successor of the parent. The updated versioned dataset is stored in the backing dataset. Data of the multiple previously stored versions remain unchanged. The updated versioned dataset stores an incremental change over the specific version (which has been created by applying the one or more structured queries to the specific version) without generating a redundant copy of the data of the specific version. For example, when the structured query is an instruction to add another row to the specific version, the additional row is added to the updated version without copying the rest of the data of the specific version. Data of preceding versions remains changed. A versioned dataset catalogue includes historical chronologically applied structured queries and lineage for each of the versions of the backing dataset. The versioned dataset catalogue is updated to include the one or more structured queries applied to the specific version, and a lineage indicating that the updated versioned dataset is a successor of the specific version. An affiliation encoding is updated to indicate which data of the updated versioned dataset matches data of the specific version, and which data of the updated versioned dataset is deleted relative to data of the specific version. For example, when the specific version includes 10 rows of data, and 1 row is deleted according to the structured query, the affiliation encoding is updated to indicate that the updated versioned dataset includes the 9 rows of data of the specific version while excluding the 1 row that has been deleted. It is noted that the affiliation encoding for the specific version indicates that 10 rows are present, and the updated versioned dataset stores data for the 10 rows for the specific version, since the data of the specific version (and preceding versions) remain unaffected. The affiliation encoding may store an order of the data of the specific version. For example, where the 10 rows of the specific version are shuffled into a new order, the affiliation encoding stores the new order. The versioned dataset retains the original 10 rows of the specific version, without recopying the 10 rows into the new order, thereby saving space, since the order is stored in the affiliation encoding.

It is noted that some embodiments relate to relational datasets with schema, but are not necessarily limiting, as at least some embodiments are applicable to other implementations for example, schemaless data, documents, graph data, and the like, when units of work can be represented as a compact, descriptive abstraction, such as a query language and the basic infrastructure for managing dataset versions is available.

At least some implementations of the systems, methods, apparatus, and/or code instructions described herein relate to collaborative and automated operations by collecting and/or sharing metadata of annotated, generally immutable versioned datasets and/or efficient storage by using shared backing tables & database views.

At least some implementations of the systems, methods, apparatus, and/or code instructions described herein address the technical problem of storing different versions of a dataset on which queries may be executed, for example, in the domain of machine learning, for example, for training, validation, and/or inference of ML models.

At least some implementations of the systems, methods, apparatus, and/or code instructions described herein improve the technical fields of databases and/or machine learning, by enabling storing different version of a dataset on which queries may be executed, for example, for training and/or validating an ML model.

Traditionally, the main purpose of databases is to reflect the most recent state of the live data (e.g., production data, serving a business logic) stored and constantly updated in the system. However, there exist use cases, where it is desirable to selectively retain historic subsets of data in a way that allows to re-run queries on that data, providing stable, consistent and reproducible query results, based on a state of data as it was at a certain point in time.

Examples of usage patterns include: cover (a) deep branching of historic versions where each successor version depends from a preceding version, (b) flat branching of alternative versions that all depend from a common preceding version, (c) "science pattern" using individual, self-contained branches from one evolving main line, where the branches are serving for reproducible experiments but are never merged back, where the main line is a sequence of successor versions each depending from a preceding version, and where the preceding version may be associated with multiple alternative versions and (d) the typical "data curation pattern" found in machine learning environments, where collaborative data cleansing is performed concurrently by data scientists, basing their work on different versions, and where changes are eventually merged back to the main line, for example, complex branching obtained by combinations of preceding and successor versions, and multiple alternative successor versions.

Conventional RDBMSs support the functionalities described above (e.g., (a), (b), (c), and (d) only to a very limited extent, by providing a snapshot isolation mechanism for query processing, which offers concurrency control and isolates transactional queries from ongoing modifications in concurrent transactions. Snapshot isolation is a central feature of RDBMSs, allowing to run queries repeatedly and retrieving consistent results within the context of a transaction.

Although snapshot isolation is sufficient for query processing, it does not satisfy any of the scenarios described herein. These snapshots are volatile, since they are limited to the duration of the ongoing transaction. As the transaction ends and a new transaction begins, a new volatile snapshot is created, reflecting a more recent, consistent state of the database. The historic snapshot is irrecoverably lost at that point in time, when the transaction that created the snapshot terminates. Eventually all transactions are participating in a single, linear history (often referred to as the serial transaction schedule) and branching is not supported. Moreover, these snapshots come with a significant negative impact on concurrency, resource usage and performance to the overall system, making it impermissible to keep transactions open for a long period of time.

Existing database designs do not address, or only partially address, and/or inadequately address the technical problem (s) described herein, for example:

(Relational) database systems provide only information about the most recent state of the data (transaction time), historical data is overwritten and irreversibly lost. Thus snapshot isolation provides only a solution for a very short duration (single transaction). In particular, snapshot isolation of long reading transactions causes significant overhead when concurrent writing transactions exist. Branching is not supported at all, since transactions are serialized into one single, sequential schedule.

Temporal databases support only one single, common history and concurrent modification are serialized into a single, sequential schedule, according to their transaction time. Fine grained versions are automatically created with each committing transaction. Tracking all changes at this fine level causes significant overhead in storing and processing historic data and live data, where such fine-grained versioning might never be actually required.

Custom solutions for machine learning provide limited integration with database systems storing the original data, suffer from high storage overhead due to redundancy among versions of one dataset, typically do not support schema changes, depend on external storage (files) and consequential overhead for conversion, offer limited system integration and performance (query capabilities, indexing, type compatibility), exhibit data security and privacy vulnerabilities.

More specifically, common relational database systems lack support for collaboration of data scientists on versioned dataset that is typical for in the ML domain and making the typical explorative try- and error workflow in model training cumbersome and expensive. Provenance of trained ML models from their training datasets, significant for reproducible model training, needs to be provided and maintained manually by the data scientists. Sharing and re-use of sophisticated and recurrent data curation procedures is not encouraged and automation is missing.

At least some implementations of the systems, methods, apparatus, and/or code instructions described herein provide an improvement over other approaches that attempted to address the technical problem(s) described herein. For example:

Some temporal databases attempt to partially address the technical problems described herein, but are still not applicable in many use-cases. Such approaches add to the classical RDBMS concept of 'transaction time', that determines the validity of volatile snapshots, the concept of 'valid time', allowing to query the database at a certain point in time, thus allowing access to historic states of data.

In particular, temporal databases do not support collaborative and/or simultaneous work with different versions of datasets (which are implemented according to at least some embodiments described in the present disclosure), since they only support one single, linear history of events, such that branching is not supported, while a fuller data version control system for covering a broader spectrum of use-cases (which is implemented according to at least some embodiments described in the present disclosure) is for supporting graph-like structures of alternative histories, much like the concept of branches in source control management systems (e.g., git).

Schema evolution techniques keep track of schema changes to a relation. However, the dataset has only a single state that is transformed along the history of multiple schemas, which is insufficient to store the history of a dataset. Even the combination of temporal database extensions with schema evolution still misses the possibility to support non-linear histories. Additionally, schema evolution techniques have limited support on the DDL (Data Definition Language) operations because of version compatibility, and generally do not support DML (Data Manipulation Language) operations.

Version control software (e.g., git, svm . . . ) may capture some notion of versioning and branching of datasets represented in textual format, e.g. as files in comma-separated values (CSV) format. But a CSV file has significant disadvantages with respect to the desired solution for a database environment: (a) a CSV file lacks complete query and indexation capabilities (SELECT); (b) the CSV file lacks an schema and has no attribute notion, thus, the version control software cannot use update statements to selectively update attribute values, or have operations to add or remove attributes from the CSV file; (c) version control software is a text based approach that applies patches, so users cannot register operations in the history (e.g. delete the row if a condition is met); (d) splitting a dataset based on predicates cannot be implemented; (e) version control software creates one copy for the version accessed by each user at a given time, which is unreasonable for a shared database with concurrent users accessing multiple versions; (f) CSV files exist independently from database systems and required separate precautions for data type conversion, recovery and privacy.

DVC is an open source project introducing the notion of pipelines as part of the commit information. The pipeline is a sequence of Python scripts that transform the data. This allows users to execute arbitrary code after fetching the data but does not solve the previous limitations.

Dedicated solutions from the machine learning domain exist, but these approaches often generally lack deep integration into the full RDBMS stack or suffer from limitations, such as relying on external, file-based storage or type mapping and inference mismatches, and missing support for schema changes between versions of one dataset.

At least some implementations of the systems, methods, apparatus, and/or code instructions described herein provide one or more of the following potential technical advantages and/or potential technical effects:

Support relational dataset versioning in addition to handling live data (e.g., production data, serving a business logic, ML training datasets).

Complete workflow for creating versioned datasets from previously unversioned data.

Evolutionary development of new versions of datasets based from unversioned and versioned datasets (applying data and schema modifications).

Efficiently management of versioned instances of relational data, in particular minimized redundancy and compact storage.

Efficiently and complete support of full SQL query capabilities across all versions of available datasets, while guaranteeing consistent and repeatable query results on historic data.

Retaining full lineage of versioned data, i.e. not only data itself, but also the history of operations that created and modified data.

Support fully concurrent operations, in particular lockless reading over versioned data.

Encourage collaboration and reuse when developing evolutionary dataset versions.

Providing deep integration with core RDBMS features, in particular data privacy, privileges and recovery.

At least some implementations of the systems, methods, apparatus, and/or code instructions described herein provide one or more of the following features:

Arbitrary DML operations, for example: INSERT/UPDATE/DELETE, on versioned data.

Arbitrary DDL operations, for example: ALTER TABLE . . . ADD, DROP, RENAME, SET.

Efficient storage, avoiding redundancies that are common for related versions of one dataset.

De-normalized storage applying compression but avoids potentially complex and expensive operations, e.g., join operations.

Extraction primitives of low complexity and high potential for optimization (e.g., selection/projection pushdown).

Distributed storage and access for MPP.

Indexing of versioned dataset, e.g. partial indexes with predicate on affiliation encoding.

Additional storage optimization using column encoding and functional attribute mapping for improving compression.

Storage reorganization (re-ordering) by user attributes for improving compression.

Storage reorganization (re-ordering) by affiliation encoding for reducing version fragmentation in a common backing table.

Transparently internal re-encoding of storage representation per dataset version at any time, between single backing table to shared backing table, controlling trade-off between space and performance.

Full integration into host RDBMS, including versioned data and live data interoperability, privileges, ACID, recovery, ingestion tooling, backup, etc.

Support for complete ML dataset linage as one embodiment (not limited to ML).

Support for dataset provenance of trained ML models.

Support for exploration, experimentation and validation in ML model training.

Support for automation in collaboration and reuse in repetitive and expensive dataset preparation processes.

Support for seamless refreshing or incremental supplementation of existing curated historic datasets with the most recent data coming from live datasets.

Full integration into live data, straightforward queries and data transfer across versioned and unversioned datasets.

Full automation of data integrity, no type conversion mismatch.

Common privilege system facilitates extending existing data privacy policies to versioned datasets.

Full RDBMS integration (transactions, recovery, backup, . . . ).

Dataset versioning extension can be added at any moment to an existing production RDBMS for equipping the system with dataset versioning capabilities. The extension installs executable functions, i.e. code, for managing versioned datasets and creates an empty repository for storing versioned datasets.

Backing table as versioned data repository, not necessarily accessible to users, consists of user columns with identical type definitions as original data, with mapped column names (avoiding naming conflicts) and optionally with auxiliary columns for version management (affiliation encoding) for compact storage of several versions of one dataset within a common backing table. Shared backing tables improve storage efficiently of versioned datasets by avoiding redundancy.

De-normalized storage in a backing table, no joins for data extraction (sparsity).

Compression addresses sparsity of the potentially wide backing table.

Dataset version views expose versioned data to users (read-only, grantable, managed projection list, encodings).

Manipulation by rewrite, e.g. via updatable views: insert, delete, update (row-wise or column-wise).

Versioned schema changes: Adding (add), dropping (hide), changing column names rename)/types (cast or copy)/collation (copy)/constraints (copy).

Support for deletion of individual datasets, if there is no dependent dataset.

Support for integration and compaction of intermediate dataset versions that became obsolete, while retaining dependent versioned datasets intact.

Configurable trade-off between storage utilization and performance (dataset creation, data access).

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
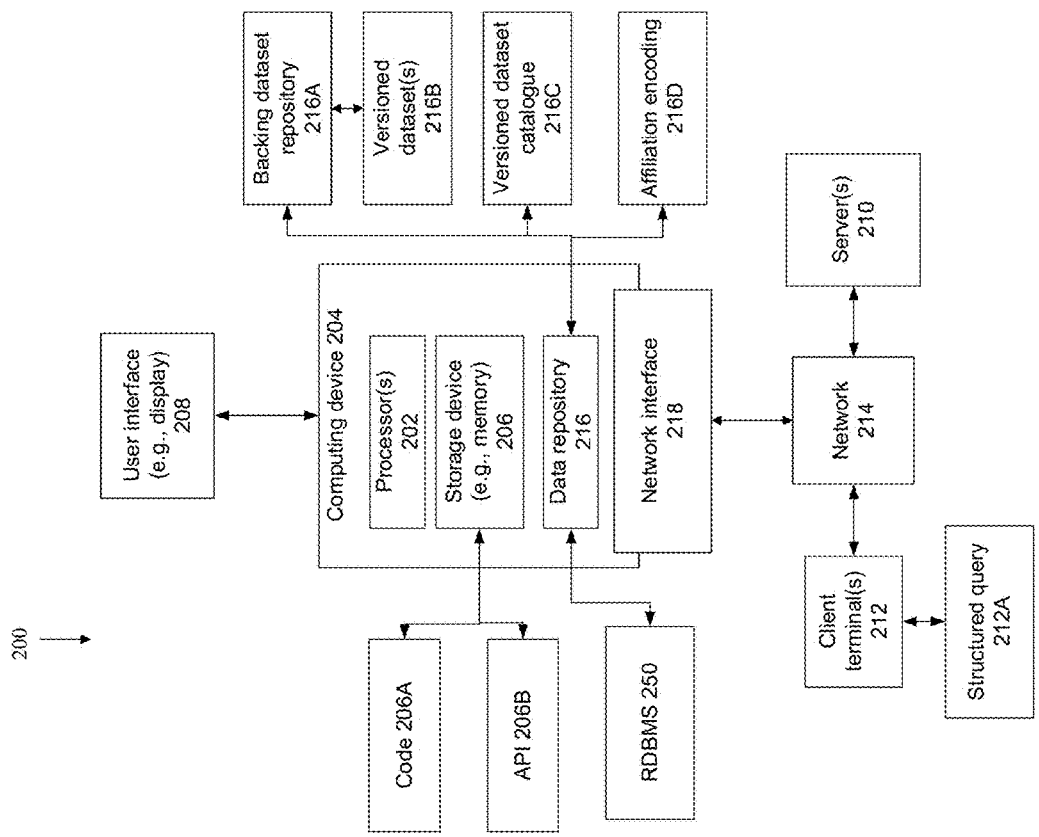
FIG. 2 is a block diagram of components of a system for managing a versioned dataset, in accordance with some embodiments.
Figure 3:
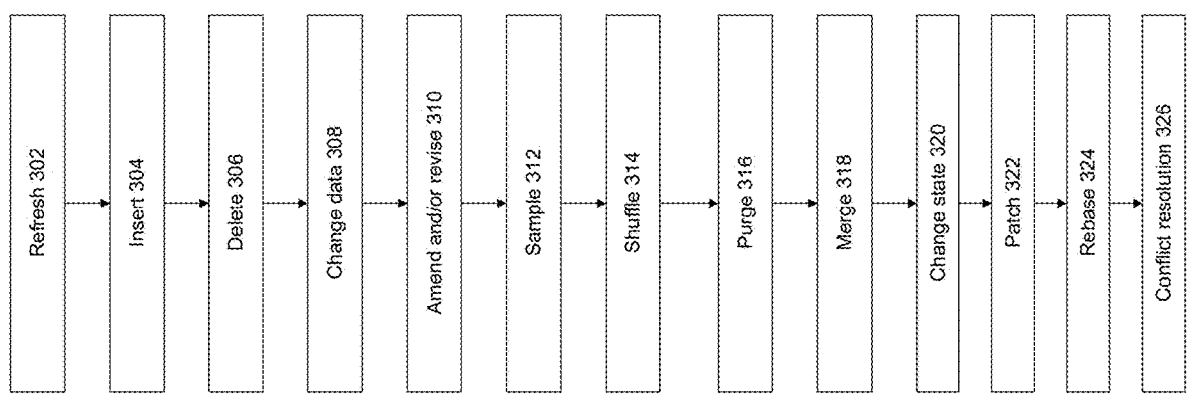
FIG. 3 is a flowchart depicting exemplary operations performed on the versioned data, in accordance with some embodiments.
Figure 4:
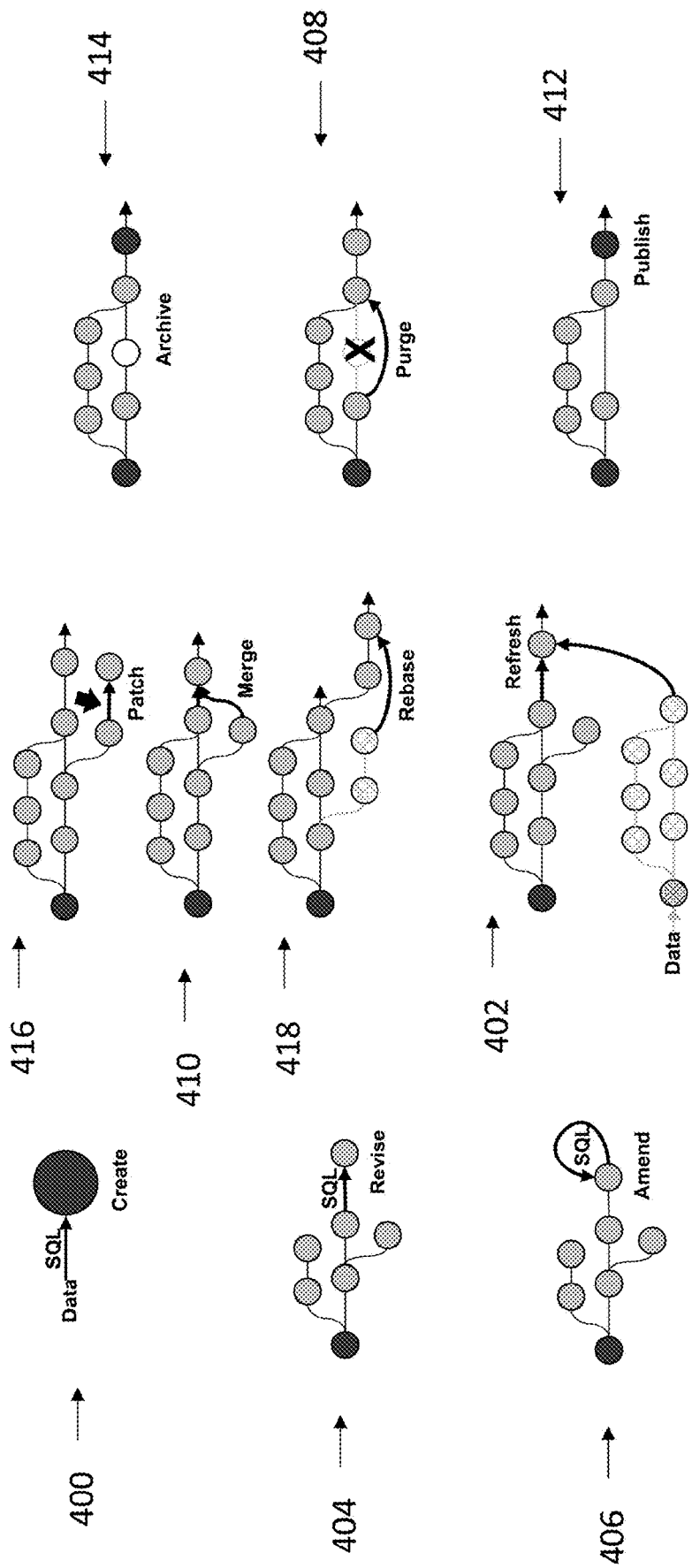
FIG. 4 is a schematic that visually depicts exemplary operations performed on the versioned data, in accordance with some embodiments.
Figure 5:
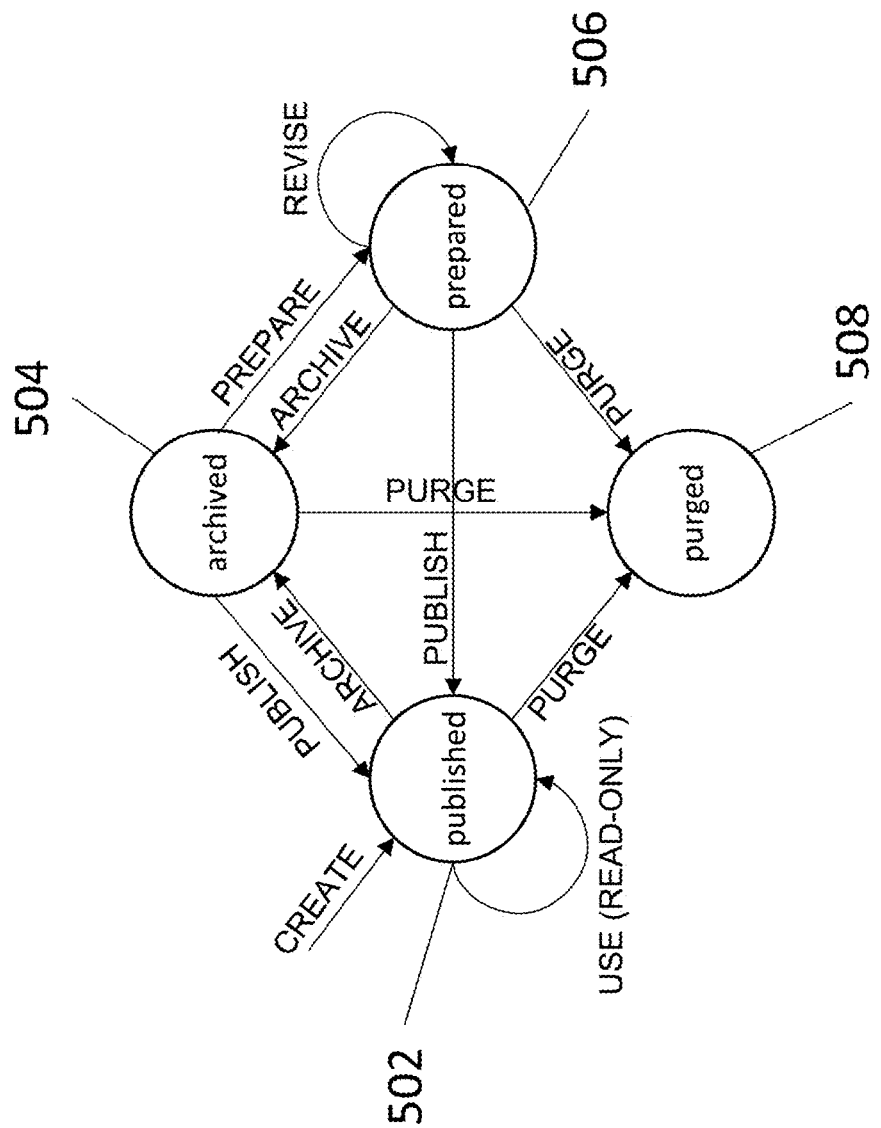
FIG. 5 is an exemplary state diagraph depicting changes between exemplary states of published, archived, prepared, and purged, in accordance with some embodiments.
Figure 6:
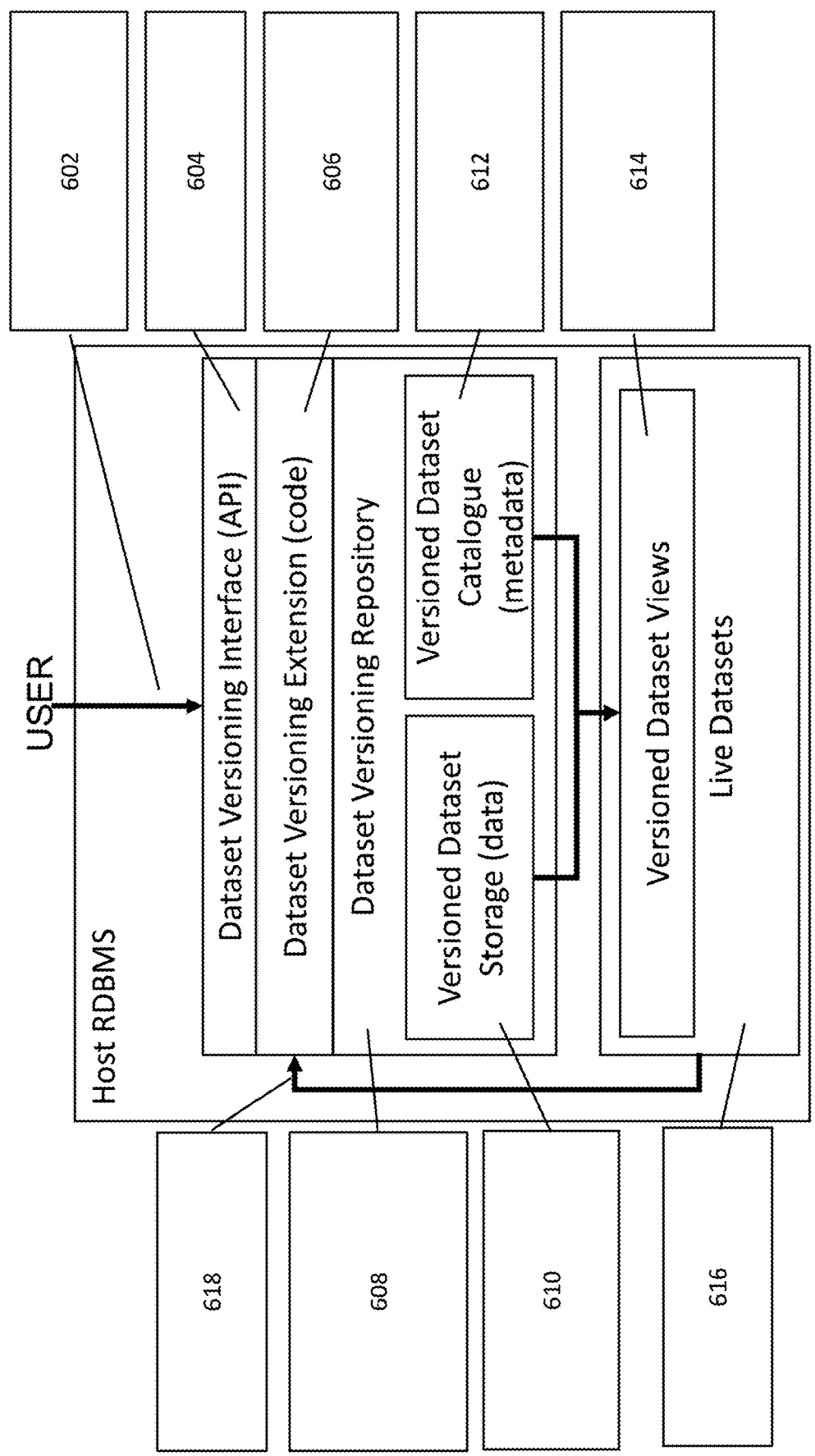
FIG. 6 is a block diagram of an exemplary implementation of code add-ons components to a transactional, relational database management system (RDBMS), for management of multiple versions of a dataset, and dataflow between the components, in accordance with some embodiments.
Figure 7A:
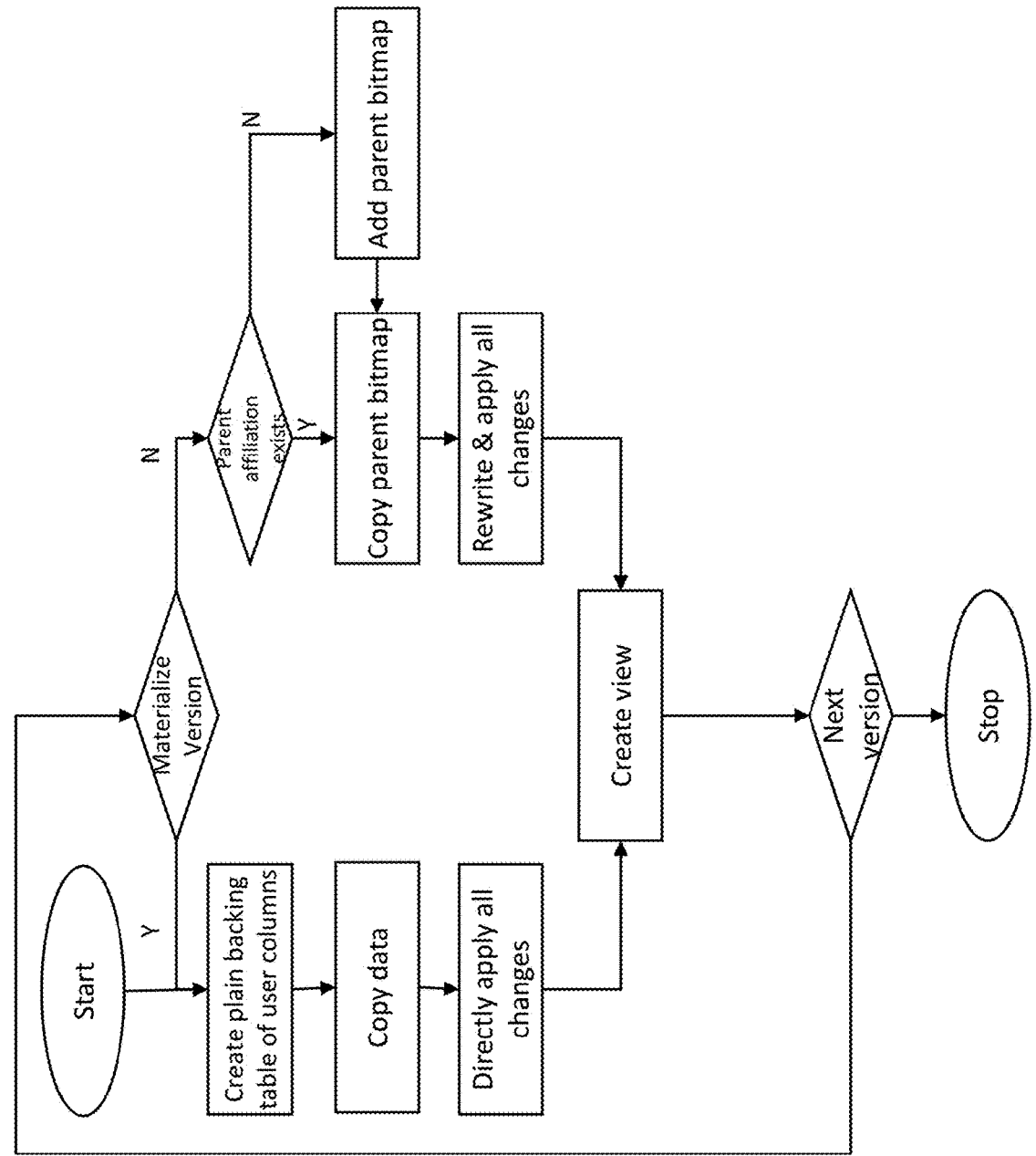
FIGS. 7A-7B are dataflow diagrams of exemplary processes for rewriting the structured queries for implementation on the specific version of the backing dataset, in accordance with some embodiments.
Figure 7B:
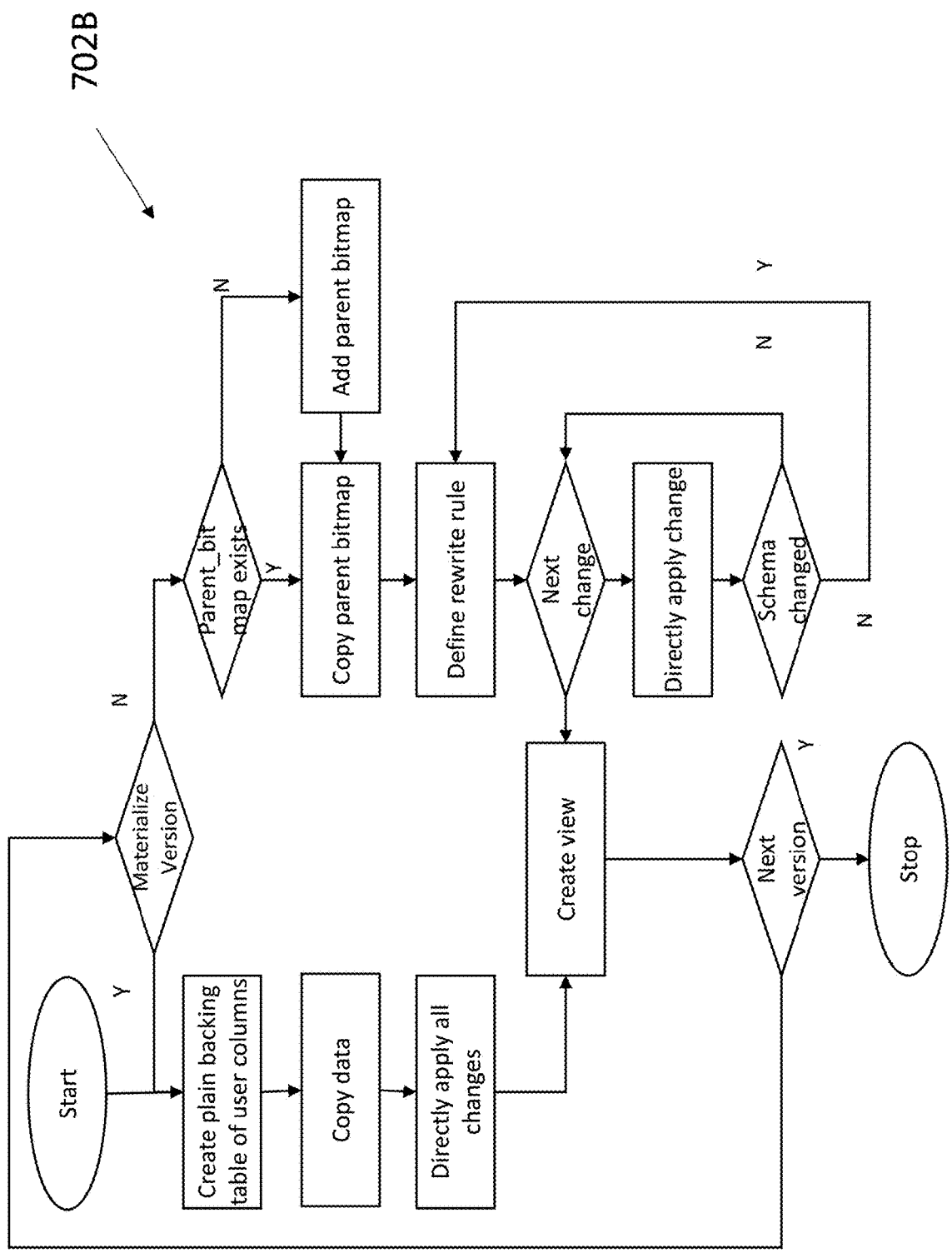
Figure 8:
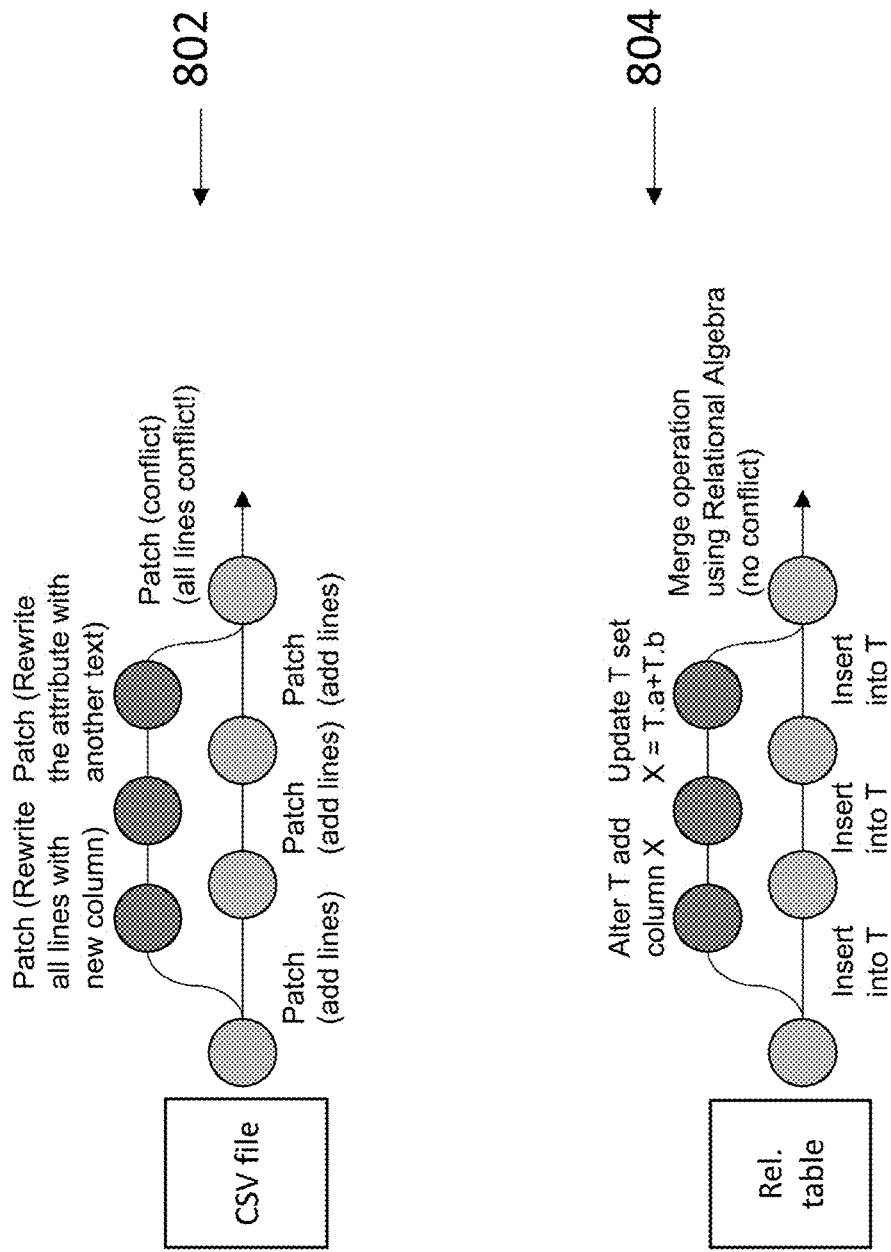
FIG. 8 includes dataflow diagrams depicting operations that result in conflict and no conflict, in accordance with some embodiments.
Figure 9:
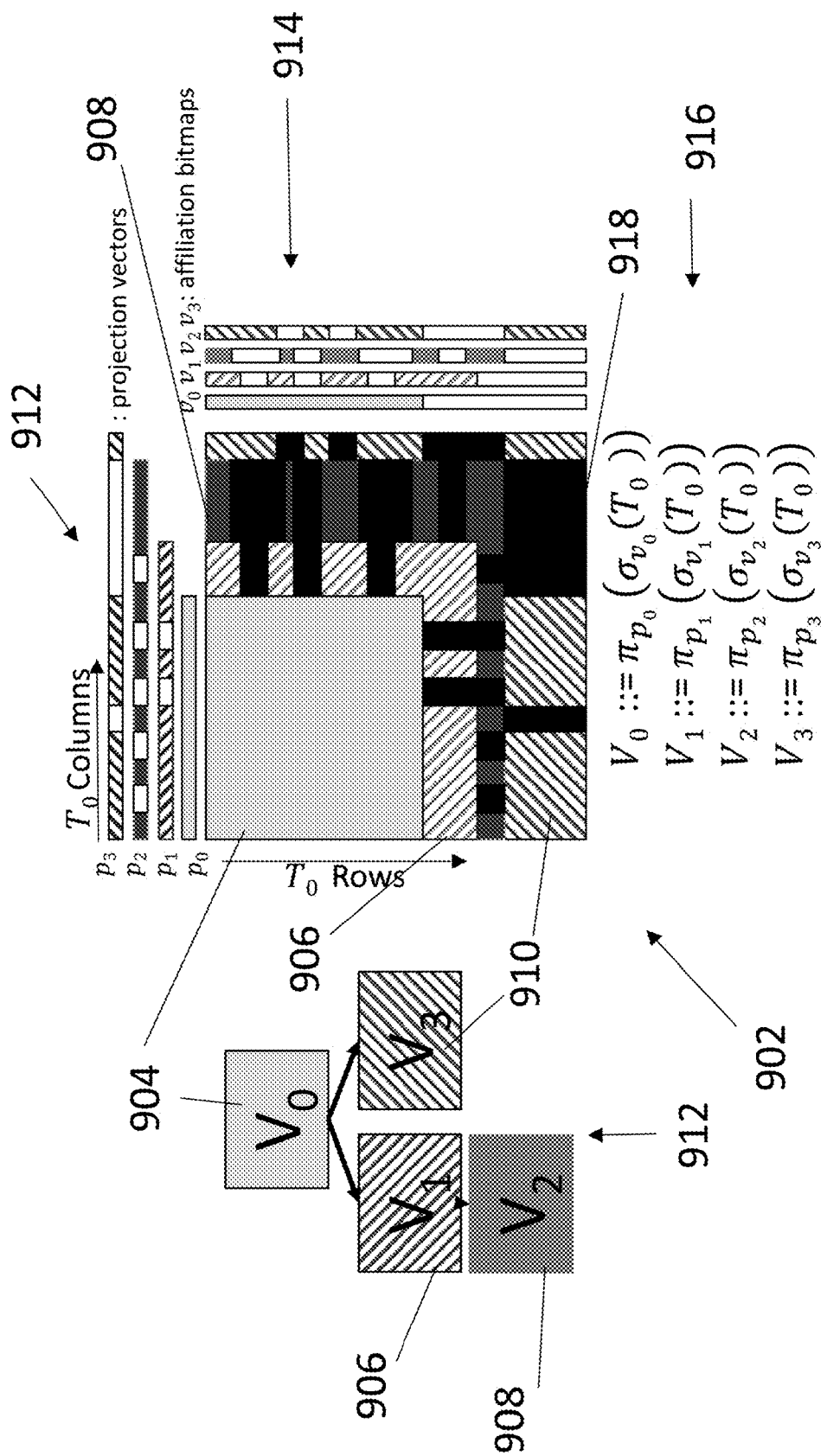
FIG. 9 is a schematic depicting an exemplary layout of a backing dataset storing multiple versions of a dataset, in accordance with some embodiments.
Figure 10:
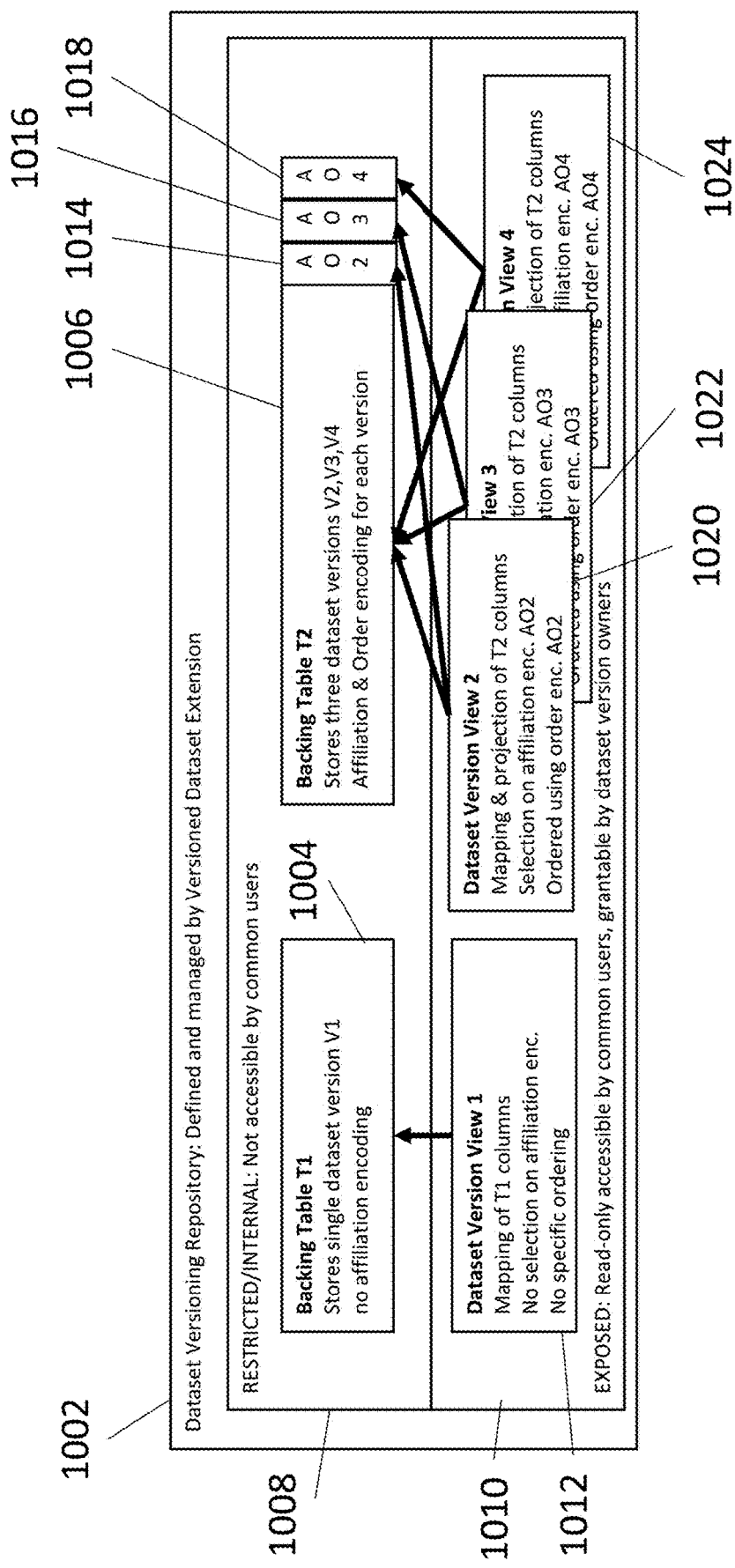
FIG. 10 is a schematic depicting exemplary storage implementations for storing multiple versions of a versioned dataset, in accordance with some embodiments.
Figure 11:
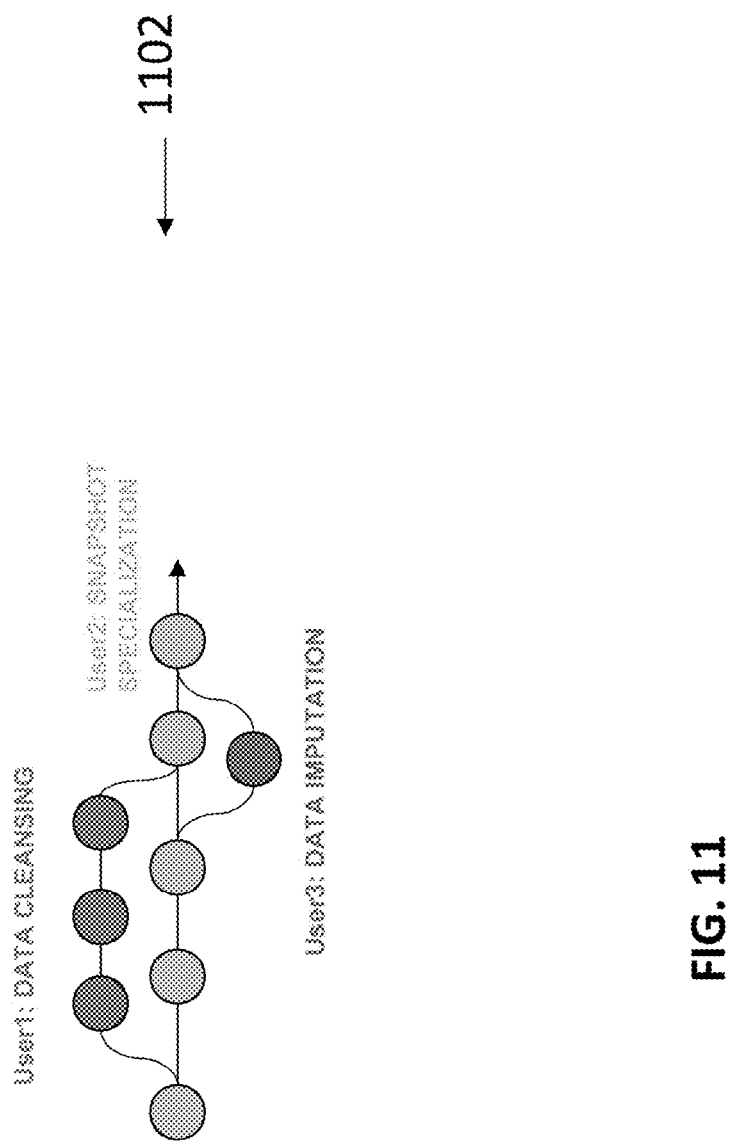
FIG. 11 is a schematic depicting an exemplary machine learning (ML) workflow which utilizes multiple versions of a versioned dataset, in accordance with some embodiments.

Reference is now made to FIG. 1, which is a flowchart of a method of managing a versioned dataset, in accordance with some embodiments. Reference is also made to FIG. 2, which is a block diagram of components of a system 200 for managing a versioned dataset, in accordance with some embodiments. System 200 may implement the acts of the method described with reference to FIG. 1 and other FIGs described herein, by processor(s) 202 of a computing device 204 executing code instructions (e.g., code 206A) stored in a memory 206. Reference is also made to FIG. 3, which is a flowchart depicting exemplary operations performed on the versioned data, in accordance with some embodiments. Reference is also made to FIG. 4, which is a schematic that visually depicts exemplary operations performed on the versioned data, in accordance with some embodiments. Reference is now made to FIG. 5, which is an exemplary state diagraph depicting changes between exemplary states of published 502, archived 504, prepared 506, and purged 508, in accordance with some embodiments. The published state 502 is also visually indicated in 412 of FIG. 4. The archive state 504 is also visually indicated in 414 of FIG. 4. Reference is now made to FIG. 6, which is a block diagram of an exemplary implementation of code add-ons components to a transactional, relational database management system (RDBMS), for management of multiple versions of a dataset, and dataflow between the components, in accordance with some embodiments. Reference is now made to FIGS. 7A-7B, which are dataflow diagrams of exemplary processes for rewriting the structured queries for implementation on the specific version of the backing dataset, in accordance with some embodiments. Reference is now made to FIG. 8, which includes dataflow diagrams depicting operations that result in conflict and no conflict, in accordance with some embodiments. Reference is now made to FIG. 9, which is a schematic depicting an exemplary layout of a backing dataset storing multiple versions of a dataset, in accordance with some embodiments. Reference is now made to FIG. 10, which is a schematic depicting exemplary storage implementations for storing multiple versions of a versioned dataset, in accordance with some embodiments. Reference is now made to FIG. 11, which is a schematic depicting an exemplary ML workflow which utilizes multiple versions of a versioned dataset, in accordance with some embodiments.

Referring now back to FIG. 9, a backing table 902 stores multiple versions of the versioned dataset, denoted $V_0$ 904, $V_1$ 906, $V_2$ 908, and $V_3$ 910. Tree 912 depicts the lineage of the versioned dataset, where $V_0$ 904 is the initial version, versions $V_1$ 906 and $V_3$ 910 are alternatives that both derive from $V_0$ 904, and $V_2$ 908 is derived from $V_1$ 906. As shown in backing table 902, $V_0$ 904 is stored will a full set of rows and columns. For each of $V_1$ 906, $V_2$ 908, and $V_3$ 910, changes in the data over the respective parent are stored in table 902, i.e., for $V_1$ 906, $V_2$ 908 changes over $V_0$ 904 are stored, and for $V_2$ 908 changes over $V_1$ 906 are stored. Black areas 918 represent default values, for example NULL, which may represent portions of the parent version that are excluded from the specific version, for example, rows, columns, and/or data that are deleted in the specific version but appear in the parent version.

An affiliation encoding 912 is provided for each version, i.e., $V_0$ 904, $V_1$ 906, $V_2$ 908, indicating the columns of backing table 902 (e.g., one or more parent versions) that are included in the specific version. An affiliation encoding 914 is provided for each version, i.e., $V_0$ 904, $V_1$ 906, $V_2$ 908, indicating the rows of backing table 902 (e.g., one or more parent versions) that are included in the specific version.

Equations 916 are an exemplary algebraic notation for generating each of $V_0$, $V_1$, $V_2$, and $V_3$ from backing table 902 by applying affiliation encodings 912 and 914 to backing table 902.

FIG. 9 depicts four versions of a single dataset, related to each other using deep nesting and branching as shown in tree 912. In an exemplary embodiment, the user data is organized in a backing table $T_0$ 902 of rows and columns. The user's data representing the actual versioned dataset are columns corresponding to the original definition of data from the live datasets, denoted 904. The backing table 902 is extended with auxiliary columns ($v_n$) representing affiliation encodings 912 (i.e. affiliation bitmaps per dataset version in some embodiments). Projection vectors $p_n$ 912 per dataset version are stored as metadata (e.g., in the dataset view definitions) for each dataset version. Data of an individual dataset version can be extracted inexpensively applying the corresponding projection $p_n$ (as in affiliation encoding 912) and the corresponding selection $v_n$. (as in affiliation encoding 914) onto the complete data of $T_0$.

The corresponding storage layout represents a wide (and growing, as new columns are added for new dataset versions) table $T_0$, where new rows for new versions are appended. This layout may resemble a sparse matrix of entries as a consequence of relational but 'denormalized' tabular storage, where large areas of consecutive rows may be set to NULL, for example, when they do not participate in any dataset version.

For supporting this storage schema efficiently, the host RDBMS provides tabular storage that may allow to add columns to an existing table $T_0$. Columns may be added inexpensively, for example, in terms of low data storage and/or reduced processor utilization. Tables storing potentially vast matrix sections of NULL values may be appropriately compressed. It is noted that inexpensive adding of columns and data compression are not strictly necessary. The corresponding costs may be used for a cost model for automated storage selection, as described herein.

Referring now back to FIG. 2, multiple architectures of system 200 based on computing device 204 may be implemented. In an exemplary implementation, computing device 204 storing code 206A may be implemented as one or more servers (e.g., network server, web server, a computing cloud, a virtual server) that provides centralized services for storing and/or manipulating datasets and/or for running queries on datasets (e.g., one or more of the acts described with reference to FIGS. 1 and/or 3 and/or other FIGs) to one or more client terminals 212 over a network 214, for example, providing software as a service (SaaS) to the client terminal(s) 212, providing software services accessible using a software interface 206B (e.g., application programming interface (API), software development kit (SDK)), providing an application for local download to the client terminal(s) 212, and/or providing functions using a remote access session to the client terminals 212, such as through a web browser. For example, multiple users use their respective client terminals 212 to provide one or more structured queries 212A for creating new versions of a versioned dataset 216B, and/or for accessing the different versions of the versioned dataset 216B stored on centralized computing device 204. In another example, computing device 204 may include locally stored software (e.g., code 206A) that performs one or more of the acts described with reference to FIGS. 1 and/or 3 and/or other FIGs., for example, as a self-contained client terminal that is designed to be used by users of the client terminal. In such implementation, the different versions of versioned dataset 216B are locally stored and/or implemented by the respective client terminal, and the user uses the respective client terminal to enter structured queries 212A to run on versioned dataset 216B. Alternatively or additionally, code 206A, which implements the features of the methods described with reference to FIGS. 1 and/or 3 may be implemented as an add-on to an existing RDBMS 250 system, and/or code 206A may connect with existing RDBMS 250 via a software interface such as an API 206B. In implementations where code 206A is an add-on and/or extension to RDBMS 250, code 206A may sometimes be referred to as versioned dataset extension. It is noted that the term versioned dataset extension provides an example implementation of code, but the term versioned dataset extension may sometimes be substituted with code that is not necessarily an add-on and/or extension.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor (s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIG. 1 when executed by processor(s) 202. Storage device 206 may store code for interfacing with RDBMS 250 and/or with client terminals 212, for example API 206B.

Computing device 204 may include a data repository 216 for storing data, for example, a backing dataset repository 216A storing one or more backing datasets where each backing dataset stores a respective versioned dataset 216B, versioned dataset catalogue 216C which may store metadata records for each version of the versioned dataset 216B, and affiliation encoding 216D. Data repository 216 may be implemented as, for example, a memory, a local hard-drive, virtual storage, a removable storage unit, an optical disk, a storage device, and/or as a remote server and/or computing cloud (e.g., accessed using a network connection).

Network 214 may be implemented as, for example, the internet, a local area network, a virtual private network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect using network 214 (or another communication channel, such as through a direct link (e.g., cable, wireless) and/or indirect link (e.g., via an intermediary computing unit such as a server, and/or via a storage device) with server(s) 210 and/or client terminal(s) 212. Server 210 may, for example, store RDBMS 250, and/or updated versions of code 206A. Client terminal(s) 212 may be used by users remotely accessing computing device 204, as described herein.

Computing device 204 and/or client terminal(s) 212 include and/or are in communication with one or more physical user interfaces 208 that include a mechanism for a user to enter data and/or view data (e.g., enter a query on a selected version of the dataset and/or view the selected version of the dataset), optionally within a GUI. Exemplary user interfaces 208 include, for example, one or more of, a touchscreen, a display, a keyboard, a mouse, and voice activated software using speakers and microphone.

Optionally, at 102, code comprising an add-on extension and/or an application programming interface (API) connected to a relational database management system (RDBMS) that manages the versioned dataset, is provided and/or installed and/or accessed. Traditional RDBMS systems do not provide access to historic data and/or do not store multiple versions of the versioned dataset. The add-on and/or API enhances an existing RDBMS by providing extended features of storing historic data and/or storing multiple versions of the versioned dataset. The RDBMS is extended with code (e.g., dataset versioning extension code) with an API allowing users to collaboratively create, manipulate and track versioned datasets.

Alternatively or additionally, the code includes full integrated functionally described herein for managing the versioned dataset.

The code may be accessed by one or multiple users. Multiple users may create different versions of the versioned dataset, which may be merged together, and/or processed in other ways, as described herein.

As used herein, the user is an exemplary user case, and is not necessarily limited to a human user. The user may be an automated user (e.g., robot, code), and/or may refer to otherwise externally and/or internally provided instructions from any source.

For example, the user is using the RDBMS for creating training datasets for training an ML model, and/or for a business case. The RDBMS may manage live data—e.g. tables and/or views which may be subject to access privileges defined and/or enforced within the RDBMS. Live data may be updated concurrently and/or access to historic data is not possible.

The RDBMS may be extended with the code (e.g., dataset versioning extension) and/or with an API allowing users to collaboratively create, manipulate and/or track versioned datasets. The RDBMS may be extended with a dataset versioning repository that is designed for storing multiple versions of a managed dataset. The repository may be initially empty, i.e. no versioned data. The repository may be part of the installation. A versioned dataset catalogue may initially include an empty table for storing metadata (e.g., history, lineage, documentation, etc.) on versioned datasets. The metadata may be shared and/or readable for all users participating in dataset versioning, optionally represented by a user group/role in the RDBMS. This user group is also entitled to use the dataset versioning extension API.

As described herein, any user having reading access to a given, existing versioned dataset may create a dependent version via the dataset versioning extension API. A unique name of the parent versioned dataset, a unique name for the new versioned dataset, and/or a list of data manipulation statements (INSERT/UPDATE/DELETE/ALTER) may be provided. Optionally, the user provides a textual comment describing the rationale/purpose of the revised dataset version. A new versioned dataset may be conceptually created using the parent's data with applied manipulations. The parent versioned dataset remains unchanged.

At 104, one or more structured queries are received, optionally, from a user. The structured query may be in (and/or converted to) structured query language (SQL). The structured query indicates instructions for manipulating data of a specific version, out of multiple versions comprised by the versioned dataset. The versioned dataset is stored in a backing dataset. The specific version may be a terminal node in a graph (or tree, or linear chain) of dependent versions derived from a common origin version. In some implementations, the specific version may be an intermediate node in the graph (or tree, or linear chain) of dependent versions, for example, for purging, and/or creating a new branch.

SQL is a domain-specific language used in programming and designed for managing data held in a RDBMS, or for stream processing in a RDBMS. The structured queries may meet one or more of the following features:
- Set oriented: used for accessing many records with one single command.
- Declarative: eliminates the need to specify how to reach a record, e.g. with or without an index.
- Equivalence with Relational Algebra: Originally based upon relational algebra and tuple relational calculus, SQL consists of many types of statements, which may be informally classed as sublanguages, commonly: a data query language (DQL), a data definition language (DDL), a data control language (DCL), and a data manipulation language (DML). The scope of the structured queries (e.g., in SQL) includes data query, data manipulation (insert, update and delete), data definition (schema creation and modification), and data access control. Although SQL is essentially a declarative language (4GL), it also includes procedural elements.

Optionally, structured queries are received from multiple users designated with access to the versioned dataset. Concurrent operations for creating and/or revising the multiple versions of the versioned dataset requested by the multiple of users on the versioned dataset are encapsulated as transactions. The encapsulation allows multiple users to create and/or revise versioned datasets atomically, where concurrent users cannot access nor affect intermediate steps of dataflow of the versioned datasets. The metadata stored in the versioned dataset catalogue is shared and readable by the multiple users.

As used herein, the terms structured queries, operations, and transactions, may sometimes be interchangeable. The terms structured queries, operations, and transactions may refer to manipulation of data performed on the datasets described herein. The term SQL is exemplary, not necessarily limited to standard SQL, and may refer to other approaches for representing instructions for manipulation of datasets.

The user may create (e.g., via the dataset versioning extension API) a first (i.e., initial) version of a dataset, and/or may create subsequent versions of an existing dataset. The user may provide a unique name for the new versioned dataset, and/or may provide a SQL query that defines the data of the first and/or subsequent versions. The SQL query may select arbitrary data that is accessible to the user, from the domain of 'live data' (e.g., in its most-recent, volatile state), and/or from existing versioned datasets (e.g., immutable, stable state). Optionally, the user may provide a list of data manipulation statements in SQL (e.g., INSERT/UPDATE/DELETE/ALTER), to be applied to the initial version of the dataset. Optionally, the user provides a textual comment describing the rationale/purpose of the created dataset version.

Additional exemplary structured queries are described with reference to FIG. 3.

At 106, optionally, the one or more structured queries are translated and/or processed for manipulating the backing table. The translation, manipulation, and conversion of the structured query provides compatibility with the RDBMS that manages the backing dataset, by enabling a user to transparently use standard queries such as SQL to manipulate the certain version which is stored in the backing dataset instead.

In one exemplary implementation, the structured queries are translated into an abstract syntax tree (AST). The AST is manipulated by substituting attribute references to obtain a manipulated AST. The manipulated AST is converted to a rewritten structured query. The rewritten structured query is applied to the backing dataset.

In another exemplary implementation, the view and/or the backing table is prepared using rewrite rules for processing the at least one structured query to manipulate the updated versioned dataset. The at least one structured query is applied to the view and/or the backing table of the current version to manipulate the updated versioned dataset. The translation uses an implicit rewrite, without manipulating the AST to obtain the manipulated AST, and without converting the manipulated AST to the rewrite structured query. The user queries are directly applied to the view, and the backing table and versioned dataset catalogue are updated according to the rewrite rule.

Referring now back to FIG. 7A, dataflow chart 702A depicts an exemplary dataflow for an explicit rewrite of the structured query. The rewrite operation translates the received query (e.g., original SQL statement) that was provided (e.g., by the user), e.g. into an abstract syntax tree (AST), manipulates (rewrites) the AST, e.g., by substituting attribute references, and finally converts the AST representation back to the resulting, rewritten SQL statement. The rewritten statements are applied against the backing table, as described herein. This approach provides a general solution, but requires capability to rewrite underlying system's SQL dialect, e.g. via conversion to/from equivalent AST representations.

Referring now back to FIG. 7B, dataflow chart 702A depicts an exemplary dataflow for an explicit rewrite of the structured query. The code provides automatic translation of attribute references via rewrite rule definitions, e.g., through instead-of triggers or updatable database views with extensive query rewrite capabilities. Changes are applied using the original SQL, as provided by the user, and are applied against the versioned dataset view without parsing and explicit rewrite. Attribute mapping is accomplished via the underlying rewrite-rules, according to rewrite-rule definitions generated by the code. Such rewrite rule definitions are affected by backing table schema changes, in particular by DDL statements but potentially also by DML statements, e.g., column shadowing. The explicit rewrite implementation may require rewrite support by the underlying system and rewrite rule definition by the dataset versioning extension code.

Referring now back to FIG. 1, at 108, an updated versioned dataset is created in the backing dataset, by applying the at least one structured query to a specific version. The specific version may be selected from the multiple versions of the backing dataset, for example, by a user. Alternatively, the specific version is automatically defined, for example, as a default, which may be adjusted. The specific version may be the last version of the dataset in a chronology of dependent datasets, and/or an intermediate dataset from which a new dependency branch is created. The application of the structured query to the specific version may create a new version of the specific version, which is in addition to the existing specific version.

The term parent version may sometimes be interchanged with the term specific version, indicating that a successor version (sometimes referred to herein as a new version) is created from the parent version by applying the structured queries.

On the data level, a new backing table may be created as a copy of the parent dataset. Subsequently, manipulations are applied directly to the new backing table. Data of both versions is stored redundantly, no auxiliary information is required within the two resulting, distinct backing tables. Alternatively, the new version may be integrated into the backing table of its ancestor.

At 110, the updated versioned dataset is stored in the backing dataset, which stores multiple versions of the versioned dataset. The architecture of the backing dataset provides storage efficiency, by using a single table and storing incremental changes to the original and/or previous versions, for example, rather than by separately storing each version.

The terms backing dataset and backing table may be interchanged, where the backing table may be implemented using other datasets that are not necessarily restricted to tables.

The data of the newly created dataset, i.e., the updated versioned dataset, is copied into the backing table. The backing table may be newly created and/or may be a previously existing backing table. The backing table (e.g., column types) may be derived from the defining SQL query. Initially, no auxiliary information is necessarily stored in the backing table. Optional manipulations are applied directly to the backing table. Backing tables may be made inaccessible to common users.

The new version may be stored in the updated versioned dataset as an increment over the specific version, i.e., the new and/or changed data is stored to reduce redundancy in the stored data, for example, rather than storing the complete new version with a redundant copy of the data of the specific version which is used for the new version.

Data of the preceding stored versions including the specific version remain unchanged and/or unaffected by the application of the structured query.

Optionally, the backing dataset is implemented as a table (e.g., in the RDBMS), optionally a single table, including rows and columns.

An original version of the versioned dataset is stored in its entirety. Subsequent versions of the versioned dataset are stored as incremental manipulations to preceding version by storing incremental rows and/or columns and by storing an indication of manipulations to the preceding version in the metadata of the versioned dataset catalogue associated with the subsequent version, as described herein.

Optionally, the backing dataset (e.g., the single table) including default values indicating deleted data is compressed. The default values indicate a mapping to values stored in a preceding version. The default values (e.g., null values) may be compressed with high efficiency, reducing storage requirements in comparison to storage of redundant values.

At 112, optionally, a new backing dataset is created. The new backing dataset includes the new dataset version, which is created by applying the one or more structured queries to the specific dataset. The new dataset version serves as the first dataset of the new backing dataset. Further versions are created from the new dataset of the new backing table.

The nesting of the preceding versions may lead to scan performance degradation and/or higher costs of data extraction of individual versions from the existing backing dataset. The new dataset version is stored in the new backing dataset for improved access and/or storage performance.

Optionally, a decision to create the new dataset is made, for example, using the following exemplary process. A configuration parameter indicates a trade-off between storage costs and access costs of one or more of the versions of the updated versioned dataset. A cost model defines the overall costs for the new dataset with respect to the configuration parameter. The new backing dataset is created for one or more versions for which the configuration parameter indicates a lower overall cost within the cost model.

The decision to start a new backing table is sometimes referred to as 'materialize'. The decision to 'materialize' the specific version to which the structured query has been applied may be manually and explicitly taken by the user, optionally individually per dataset version, optionally at revised dataset creation time, for example, by setting a configuration parameter per versioned dataset. Alternatively the decision to materialize may be automated, for example, by establishing a user-set configuration policy, defining a trade-off between dataset version storage cost and dataset version access cost, as deep nesting of versioned datasets in shared backing tables may lead to scan performance degradation, due to higher costs of data extraction of one individual versioned dataset from the shared backing table. Automation may use a cost model that evaluates storage requirements versus access costs over a set of dataset versions and chooses the individual storage model for each member of the set of dataset versions in one or more backing tables. Finally, the code may convert (automatically or manually triggered) between storage representations for any dataset version at any time, in order to adapt global storage and access cost characteristics of the versioned dataset repository as needed.

At 114, a versioned dataset catalogue is updated. The versioned dataset may store metadata records, for example, a respective record for each of the versions of the dataset. The versioned dataset catalogue includes historical chronologically applied structured queries and lineage for each of the versions of the backing dataset. This metadata may be stored as a structured query script, which may serve as documentation, defining the origin of the versioned dataset for collaborating users.

The versioned dataset catalogue is updated to include in association with the updated versioned dataset, the at least one structured query and lineage indicating that the updated versioned dataset includes a successor of the specific version.

Examples of the lineage of the respective version stored in the versioned dataset catalogue denotes dependencies between the versions of the versioned dataset include: direct ancestor of the respective version, one of multiple ancestors to a preceding version, a root ancestor indicating a first version with no preceding versions, and a direct ancestor of two or more versions that are merged.

A new metadata record may be created, and/or an existing metadata record associated with an existing versioned dataset may be updated. Optionally, the metadata records the given name of the new versioned dataset. The record may include the original SQL query defining the dataset and/or optional data manipulation statements—i.e. a chronologically ordered list of applied SQL statements. This SQL script may serve as documentation, defining the origin of the versioned dataset for collaborating users, and/or may serve at a later point as the list of defining operations for creating a 'more recent' version of the original versioned dataset, from the current state of the live data (e.g., refresh operation described herein). Metadata may include the versioned dataset's state (e.g., published/prepared/archived), optional user-defined textual comments, and/or may include dependencies between multiple versioned datasets (e.g., direct ancestors, root ancestor—empty/not defined for the 'first' version of a datasets) and/or the relationship with the backing table. The creating user may be recorded as the owner of the dataset version. Selection/Projection/Mapping information (if any) for the subsequent view definition may be stored redundantly as metadata. It is noted that it may be sufficient to store them directly in the view definitions.

The list of original manipulation statements provided by the user may be stored in the metadata record. The rewritten operations become obsolete after the manipulation. The new dataset is marked as successor version of the dataset version that serves as its parent. Following the chain of versioned dataset ancestors within the metadata provides the complete list of defining operations (chronologically ordered list of initial query and all subsequent manipulations) for any existing dataset version at any time. The metadata provides a complete documentation of each versioned dataset's definition. An optional user-provided textual comment documenting the revision may be stored in the metadata.

At 116, an affiliation encoding is updated. The affiliation encoding indicates, for each version stored in the backing dataset, which data (e.g., rows and/or columns) of the updated versioned dataset match which data (e.g., rows and/or columns) of the specific version, and which data (e.g., rows and/or columns) of the updated versioned dataset are deletions relative to the specific version.

The affiliation encoding associated with the updated versioned dataset is updated to indicate which data of the updated versioned dataset matches data of the specific version and which data of the updated versioned dataset is deleted relative to data of the specific version.

If not already existing, an affiliation encoding for the specific version is generated. The affiliation encoding may be a separate data structure independent of the metadata, and/or may be included in the metadata. After this first, optional step, the affiliation encoding for the new version may be generated. Initially the affiliation encoding is a copy of the immediate ancestor's affiliation information.

In an exemplary implementation, the affiliation encoding is implemented as a bitmap. In response to a new row and/or column being added to the updated versioned dataset, the affiliation encoding bitmap includes Boolean values for each respective row set to TRUE iff (if and only if) that respective row and/or column participates in the updated versioned dataset and to FALSE otherwise. When the backing table serves only for storing the parent version, the parent dataset's affiliation bitmap is generated such that all values are set to TRUE. The bitmap is a highly efficient data structure (e.g., in terms of storage requirements and/or processing requirements) for indicating which rows and/or columns belong to which version.

Other implementations of the affiliation encodings are possible, like encoding affiliation for each version in an element of an array per row.

At 118, orphaned data may be removed from the backing dataset. Orphaned data (e.g., rows and/or columns) in the backing dataset that are un-associated with any of the versions are identified. The orphaned data (e.g., rows and/or columns) are automatically removed from the backing dataset. Removing the orphaned rows and/or columns increases storage efficiency by removing data that is not used by any versions of the versioned dataset.

At 120, a database view of the updated versioned dataset is generated by selecting data (e.g., rows) and projecting other data (e.g., columns) of the backing dataset corresponding to the updated versioned dataset according to the affiliation encoding.

The database view stores a mapping indicating a calculation of data (e.g., columns and/or rows) of the updated versioned dataset from data (e.g., columns and/or rows) of one or more preceding versions. The view of the updated versioned dataset defines instructions for applying the calculations to the data (e.g., columns and/or rows) of the one or more preceding versions according to the mapping. Exemplary calculation includes: renaming, negation, type cast, addition, concatenation, arbitrary unary and n-ary mappings available in an RDBMS, and user-defined mappings, and/or coalesce.

Mapping may be used in the form of column and/or row calculations, for example, avoiding column name collisions in backing datasets that will potentially store data for multiple dataset versions with possibly overlapping and conflicting column names. In some implementations, an internal, canonical naming scheme for backing dataset columns is used (e.g. f0, f1, . . . ). The mapping may be provided, for example, to original user-provided column names, as defined by the initial structured query, within the view definition.

The calculations may be defined by the host RDBMS, providing compatibility with, and/or enabling use of existing RDBMS.

A new database view may be created, and/or an existing view may be updated. The view may be defined as a named entity managed by the RDBMS and/or defined using a textual representation in form of a SQL query, for exposing the created versioned dataset within the RDBMS with the given unique name. The view definition selects rows and columns from the corresponding backing table according to the associated affiliation encoding. Optionally, mapping may be used in the form of column renaming, for avoiding column name collisions in backing tables that will potentially store data for multiple dataset versions with possibly overlapping and conflicting user-defined column names. Exemplary implementations use an internal, canonical naming scheme for backing table columns (e.g. f0, f1, . . . ) and provide the mapping to original user-provided column names, as defined by the initial SQL query, within the view definition.

When a dedicated backing table is used (i.e., storing only the new version), the view is a simple view without projection or selection, but may include mappings for column renaming. When a common backing table is used (i.e., storing multiple versions), the view defines a selection on the new versioned dataset's affiliation encoding, for example, limiting data access to (e.g., only) rows from the backing table participating in the current dataset version. A corresponding projection may be defined, limiting data access (e.g., only) to columns participating in the current dataset version. Finally, mappings may be defined for those columns of the updated versioned dataset that are calculated from one or more columns of the backing table (e.g. renaming, negation, type cast, addition, concatenation, coalesce, . . . ), for example, using arbitrary unary and n-ary mappings (explicitly including user-defined mappings) that may be available in the host RDBMS. When affiliation encoding for the parent snapshot was added in the course of the updated versioned dataset revision, the parent's view (i.e., the specific version) may also be updated to use selection on affiliation encoding and projection vectors.

The view may provide controlled reading access to the backing table by means of privileges, defined and enforced within the RDBMS. Optionally, the view may be initially accessible only to the owner of the updated versioned dataset, but may be grantable to other users, by means of the host RDBMS's privilege system. Updated versioned datasets may be created in the state 'prepared'—emphasizing that the updated versioned datasets are currently work in progress. Alternative implementations may create the updated versioned datasets in the state 'published'. Other users with corresponding privileges may explore the metadata and discover versioned datasets with full documentation of their origin and also access the data, if granted by the individual owners.

At 122, one or more features described with reference to 104-122 may be iterated, for example, for processing further structured queries, for example by the same user and/or different users. Other users (e.g., with corresponding access privileges) may explore the shared metadata and/or discover versioned datasets with full documentation of their origin and/or access the data, for example, when granted access (e.g., by the corresponding dataset version's owner).

Referring now back to FIG. 3, features of FIG. 3 represent some examples of structured queries. Some features of FIG. 3 are visually depicted in FIG. 4. For each feature, a summary is first provided, followed by additional detail. As shown in 400 of FIG. 4, a filled in circle denotes a dataset created by applying the structured queries (e.g., SQL) to an existing dataset.

At 302, a refresh operation is performed, which is visually depicted in 402 of FIG. 4. The refresh operation may serve at a later point to create a 'more recent' version of the original (or other lineage) versioned dataset from the current state of the live data (or other updated data).

It is noted that the operations described herein are exemplary, and do not necessarily cover the full set of possible operations. For example, the amend operation, may be optional in some implementations, and may be omitted without compromising general applicability of the present disclosure. Moreover, the names provided herein (e.g., creation, revision, and the like . . . ) of the individual operations, and/or the particular states (e.g., published, prepared, archived) are exemplary and not necessarily limiting.

The following is an exemplary implementation of the refresh operation: Re-execute the historical chronologically applied structured queries stored in the versioned dataset catalogue for creating an updated version of the specific version of the multiple versions of the versioned dataset from current live data. Store the updated version in the versioned dataset. Update the versioned dataset catalogue with an indication of the lineage and re-execution for the updated version.

It is noted that refreshing versioned dataset histories can lead to conflicts, e.g. if the schema of the live data has changed, and may requires conflict resolution. The metadata of the merged dataset reflects the resolved, conflict free list of operations.

At 304, an insert operation for inserting new data into the specific version is performed. Storage efficiency is provided by storing the incremental new data for the new version, rather than by storing the entire new version. Older versions are unaffected, and are maintained using the metadata.

The insert operation may be for inserting a new row and/or new column into the specific version. The backing dataset is updated to include the new row and/or new column. The affiliation encoding is updated to indicate that the new row and/or new column are associated with the updated versioned dataset. The new row and/or new column are un-associated with other versions. The view of the updated versioned dataset created by selecting rows and projecting columns of the backing dataset corresponding to the updated versioned dataset includes the new row and/or new column.

At 306, an operation for deleting data (e.g., a row and/or column) from the specific version is performed. The affiliation encoding is updated to indicate that the row and/or column of the specific version is excluded from the updated versioned dataset, wherein the row and/or column is non-deleted in the backing dataset and the affiliation encoding is updated to indicate that the deleted row and/or deleted column is un-associated with the updated versioned dataset, wherein the deleted row and/or deleted column remains associated with other versions.

The actual data of the deleted row and/or column is maintained in the backing table when previous versions of the dataset are accessed. The view of the updated versioned dataset created by selecting rows and/or projecting columns of the backing dataset corresponding to the updated versioned dataset excludes the deleted row and/or column.

At 308, an operation for changing data (e.g., a value(s) in a row and/or column) for the specific version is performed. The data unaffected by the change is maintained in the backing table and used when previous versions of the dataset are accessed. The data (e.g., row and/or column) affected by the changing value is copied. The backing dataset is updated to include the copy. The value is changed on the copy. The affiliation encoding is updated to indicate that the copy with changed value is associated with the updated versioned dataset. The copy with the changed value is un-associated with other versions. Unchanged values in the copy associated with the updated versioned dataset are stored as a default value indicating a mapping to corresponding data stored in the specific version. The view of the updated versioned dataset is presented by substituting the default values with the corresponding data according to the mapping. The default values may be compressed with high efficiency, so that only one copy of the actual values is stored rather than multiple copies.

An exemplary update operation for rows includes: a combination of INSERT and DELETE. Copy (e.g., INSERT) all rows from the parent version affected by the update (i.e., original rows) to the current version (i.e., copied rows). Remove (e.g., DELETE) original rows from the current version by updating the affiliation encoding. Apply the update to the copied rows in the current version. Affiliation encoding helps guarantee correct access to respective rows, no update of the parent dataset's or current dataset's view definition is required.

An exemplary update operation for columns includes: create a copy of the parent's columns affected by the update operation (i.e., original columns) and rewrite the update operation such that the copy is updated instead of the original. Update the current version's dataset view projection to access copied columns instead of original columns.

An exemplary general affiliation encoding process for the update operation includes: encode the update operation using encodings of existing and new columns with functional mappings in the dataset view definition. In an example (column-shadowing): create columns (target columns) by using column definitions of columns affected by the update from the parent version (original columns) and populate them with default values (e.g. NULL for undefined), redirect update operations to populate target columns with updated values, instead of overwriting values in original columns. Update the current version's dataset view projection to access first target columns and, if the target column's value is the default value (e.g. NULL for undefined), then access the original columns (e.g. COALESCE (target, original)).

At 310, an operation of amendment (also referred to herein as amend) and/or revision (also referred to herein as revise) of one of the versions stored in the backing dataset is performed. The amendment of one of the versions is visually depicted in 404. Existing datasets may be amended, rather than creating a new version. In comparison, to help understand the difference between amendment and revision, a revision operation, which is performed (e.g., as described with reference to FIG. 1, where the features described with reference to FIG. 1 may be described generally for a revision operation) on the specific version by applying structured queries to the specific version to create a new version is visually depicted in 406 of FIG. 4.

An exemplary amend operation includes: Selecting one of the versions stored in the backing dataset. Verifying that the selected version has no depended versions, e.g., that the selected version is a terminal node in a dependency graph of versions. Applying the at least one structured query to the selected version. Updating the metadata of versioned dataset catalogue associated with the selected version to further include the applied at least one structured query to existing historical chronologically applied structured queries. And updating the view of the selected version according to the applied at least one structured query.

Additional details of an exemplary amendment and/or revision operation are now provided. The Dataset versioning extension code (e.g., API) allows a user to amend an existing 'prepared' versioned dataset, which is also owned by this user. Amending is not possible for datasets that already have dependent versions, i.e., only dataset versions on the tip of any branch of the version graph may be amended, internal datasets can be revised instead. Datasets that are in state 'published' also cannot be amended, because they have been intended to be 'shared' with other users. Similarly, 'archived' dataset cannot be amended.

Technically, the amend operation is very similar to the revision operation, but instead of creating a new version, it will update and extend an existing one. The user may provide the unique name of an owned dataset version, currently having no existing dependencies, together with a list of data manipulation statements. Optionally, the user provides a textual comment describing the rationale/purpose of the amended dataset version. Any qualifying dataset version may be amended repeatedly. Other users may create dependent dataset versions (revisions) of a given dataset version at any time, inhibiting amendment of that particular dataset version. In this case, the user may create a revision as a new branch, instead of an amendment.

On the data level, the code will continue to apply data manipulation, leading exactly to the same result as if the amended manipulation was already appended to the list of data manipulations of the original revision step.

On the metadata level, the original manipulation statements provided by the user are appended to the chronologically ordered list of manipulation statements in the existing metadata of the record in the amended dataset version. An optional user-provided textual comment documenting the amendment is also recorded in the metadata. If necessary, the view definition is updated, e.g. projection will reflect added or dropped columns or mapping will define column renaming and access to calculated data. The name of the dataset version, the view name and all established access privileges remain unchanged. Amended dataset versions remain in their original state, as prepared.

At 312, an operation of sampling and/or partitioning of at least one subset of the specific version is performed. The sampled dataset may be used, for example, for creating different datasets for training and/or validation of ML models.

The sampling and/or partitioning operation may be performed by creating the updated versioned dataset that includes the at least one subset. The versioned dataset catalogue for the updated versioned dataset includes lineage indicating that the at least one subset of the updated versioned dataset is derived from the specific version.

Additional details of an exemplary sample operation are now provided. The dataset versioning extension code (e.g., API) allows users to sample any read-accessible dataset version (i.e. a revisable dataset version) for creating one or more subsets and persist those as individually named datasets versions, each having the original dataset version as their common ancestor. The user provides the unique name of the parent dataset version to be sampled, and for each dataset sample instructions for sampling, e.g., one or more of:

Specification of size, e.g., a percentage (i.e. numeric within interval [0.0 . . . 1.0]) of the sample relative to the size of parent dataset, or the absolute number of rows (i.e. numeric within interval [1 . . . no. of parent rows]) in the sample.

Specification of name, e.g., a full name, or a postfix to be appended to the parent dataset name, for generating a unique name for each sample dataset Specification of sampling: e.g., nondeterministic, deterministic, stratification, etc.

A textual comment documenting the sampling revision

On the data level, sampling may be implemented by copying a subset of rows (chosen according to the user's sampling specification) to a new backing table. Alternatively the dataset sample can be efficiently stored in a common backing table with its parent. This can be achieved, for example, by copying the affiliation information of the parent dataset and then removing participation of individual rows according to the user's specification of sampling from the copy. Both exemplary approaches create physically persisted representations of the dataset sample. As another alternative, dataset samples can be created as pure logical entity, computed directly from the parent dataset, e.g. by means of a selection, and without requirement for modification/representation in the data level.

On the metadata level, each dataset sample represents a new, individual dataset version, with its own metadata record. The new dataset is marked as successor version of the dataset version that serves as its parent. Sampling instructions are recorded similar to defining SQL query and data manipulation, such that following the chain of ancestor versions within the metadata provides the complete list of defining operations (chronologically ordered list of initial query, all subsequent manipulations and sampling instructions) for any existing dataset version at any time. The metadata provides a complete documentation of each versioned dataset's definition. An optional user-provided textual comment documenting the revision is also recorded in the metadata.

A dedicated view definition is created according to the chosen approach on the data level, i.e. as a view extracting data from the corresponding backing table. As an alternative to physically persisted dataset samples, the view definition may also retrieve data directly from the parent dataset, such that the user's sampling instructions are reflected in the view definition, defining an appropriate selection of rows from the parent dataset. Definitions for projection and mappings are typically inherited from the parent dataset. The logical approach to sampling is represented on the metadata and view level, but not on the data level.

Dataset samples are created in state 'prepared'. Alternative implementations may inherit their parent's original state, prepared or published.

At 314, an operation of shuffling data, i.e., change order of data, of the specific version is performed. The shuffled dataset may be used, for example, for creating different datasets for training and/or validation of ML models.

The shuffling operation may be performed by creating the updated versioned dataset that includes the shuffled data. The shuffled data is implemented as at least one of: a mapping of data of the specific version to a new order of the updated versioned dataset, and a copy of data of the specific version to the new order of the updated versioned dataset. The versioned dataset catalogue for the updated versioned dataset includes lineage indicating that the updated versioned dataset with shuffled data is derived from the specific version, and indicates instructions for shuffling of the data of the specific version to create the updated versioned dataset.

Additional details of an exemplary shuffle operation are now provided. The dataset versioning extension code (e.g., API) allows users to shuffle any read-accessible dataset version for creating one or more shuffles and persist those as individually named dataset versions, each having the original dataset version as their common ancestor. The user may provide the unique name of the parent dataset version to be shuffled, and for each dataset shuffle instructions for shuffling, e.g., one or more of:

Specification of name, e.g. a full name, or a postfix to be appended to the parent dataset name, for generating a unique name for each shuffle dataset.

Specification of shuffling, for example: random-nondeterministic, random-deterministic, lexicographical order of (potentially mapped) column attributes, and the like.

A textual comment documenting the shuffling revision.

On the data level, technical potential for representing shuffles is limited, since general RDBMS do not enforce or guarantee deterministic row-wise reading order for relations (datasets), a consequence of the underlying relational algebra, which generally operates on unordered sets. Hence, creating a copy in a separate backing table may be used only for creating a physical representation of random-nondeterministic shuffles. General, deterministic shuffling typically uses shared backing tables. A shuffled versioned dataset may be created from its parent by reusing the parent affiliation information (if it exists, in any case no copy is required). If the user specified the shuffle's order as a lexicographic order of mapped column attributes, the required shuffle order can be established by explicit row-reordering (sorting) according to these instruction (to be defined on the view level). Alternatively, the backing table may be extended with an auxiliary order column (as part of the dataset version's affiliation & order encoding), defining the ordinal position of a row within the shuffle. The values of the auxiliary order column are populated such that the system can establish the required row order by sorting on the auxiliary order column. Affiliation & order encoding are then leveraged by the view definition for providing stable ordering by means of sorting.

On the metadata level, each dataset shuffle represents a new, individual dataset version, with its own metadata record. The new dataset is marked as successor version of the dataset version that serves as its parent. Shuffling instructions are recorded similar to defining SQL query and data manipulation, such that following the chain of ancestor versions within the metadata provides the complete list of defining operations (chronologically ordered list of initial query, subsequent manipulations, sampling, and shuffling instructions) for any existing dataset version at any time. The metadata provides a complete documentation of each versioned dataset's definition. An optional user-provided textual comment documenting the revision is also recorded in the metadata.

Successive revisions, amendments and samples of shuffled datasets preserve the established order, such that the most recent order instruction in the chronologically ordered list of operations applies to all dependent dataset versions. If the list of defining operations contains multiple shuffling instructions, the most recent shuffling supersedes previous shuffling. Alternative implementations may use a scheme to merge non-conflicting shuffling instructions.

On the view level, a dataset shuffle uses identical selection (i.e., on the parent's affiliation encoding, if existing) and projection and mappings as its parent dataset. In addition, shuffles introduce the concept of order to the view definition. The order of the shuffle can be defined by a lexicographical order on any combination of (potentially mapped) user-defined columns, or may be defined on an auxiliary column (dedicated to the versioned dataset shuffle) for order encoding. The order is typically enforced by a corresponding instruction (ORDER BY) in the view definition that will establish the required order by means of sorting.

The view is providing controlled reading access to the backing table by means of privileges, defined and enforced within the RDBMS. The initial privilege setting of a dataset shuffle is inherited from the parent dataset.

Dataset shuffles are created in state 'prepared'. Alternative implementations may inherit their parent's original state, prepared or published.

At 316, an operation for purging the specific version is performed. The purge operation is visually depicted in 408 of FIG. 3. The purge operation may attempt to free occupied storage capacity of the purged dataset, while leaving integrity (e.g., data and history) of possible dependent dataset versions intact and unaffected.

An exemplary purge operation may be performed by: Deleting data exclusive to the specific version and non-existent in any dependent dataset from the backing dataset. Deleting metadata exclusive to the specific version and non-existent in any dependent dataset from the versioned dataset catalogue. And updating the metadata of the versioned dataset catalogue or the at least one dependent dataset by changing dependencies from the purged version to an earlier version from which the purged version depends from.

Additional details of an exemplary purge operation are now provided.

The dataset versioning extension code (e.g., API) allows a user to purge an existing dataset version (published, prepared, or archived), which is also owned by the user. The purge operation removes a particular dataset version from the system, such that it becomes inaccessible. In addition, the purge operation attempts to free occupied storage capacity of the purged dataset, while leaving integrity (data and history) of possible dependent dataset versions intact and unaffected.

On the data level, all data related to a purged dataset version without any dependent dataset versions can be deleted. The same applies, if dependent datasets exist, but are stored in separate backing tables. Otherwise either (A) data dependencies can to be resolved by re-encoding affiliation information of a common backing table, before data can be deleted or (B) dependent datasets are relocated to different backing tables.
- (A) can be accomplished, for example, by deletion by affiliation: All rows and columns belonging exclusively to the purged dataset are deleted from the common backing tables. This will automatically preserve all rows and column that are marked as shared among dependent dataset versions in the shared backing table's affiliation encoding. Affiliation information serving only the purged dataset can also be deleted or re-encoded (depending on the implementation). As a consequence, the purged dataset is integrated into all its successors.
- (B) can be accomplished, for example, by relocation: The dataset versioning extension moves all dependent datasets (potentially recursive) to separate, new backing tables or dependent datasets are pushed down into separate, existing backing tables. As a consequence of this reorganization, the dataset to be purged has no dependent datasets within the same backing table and may be safely deleted. Once the data integrity of dependent datasets has been established, all rows and columns referenced only by the purged dataset can be deleted from its backing table. Affiliation information serving only the purged dataset can also be deleted or re-encoded (depending on the implementation). As a consequence, the purged dataset is integrated into all its successors.

The code may freely choose between arbitrary combinations of re-encoding and relocation for each dependent datasets when reorganizing storage during a purge operation. Also inverse relocation of dependent datasets from separate backing tables into a shared backing tables and corresponding re-encoding of affiliation is possible. The code may aim to meet a configuration goal, e.g., by a user-set configuration parameter, or by applying policy-driven automated storage model selection introduced earlier, for meeting a given trade-off between storage efficiency and performance in data retrieval for all individual dataset versions affected by the purge operation, not limited to immediate successors.

On the metadata level, each current ancestor (can be none, one, or more after a merge operation) of the purged dataset becomes the immediate ancestor of all dataset versions directly depending on the purged dataset. For preserving integrity of the history of operations defining dependent dataset versions, the list of operations originally associated with the purged dataset is prepended to the list of operations of all direct successors, such that following the chain of ancestor versions within the metadata provides the complete list of defining operations (chronologically ordered list of initial query and all subsequent manipulations) for any existing dataset version at any time. Similarly, the descriptive user comment originally associated with the purged dataset is prepended to the user comments of all direct successors. Finally, the metadata record corresponding to the purged dataset is deleted.

The view corresponding to the purged dataset is deleted and thereby also all existing access privileges are revoked.

Purged datasets are deleted without trace of their existence on the data, metadata, and view level. Correspondingly they carry no state.

Other users with corresponding privileges may explore the metadata and discover that the purged dataset has ceased existence and therefore became inaccessible. The purged dataset's unique name may be reused for naming a new dataset of any user.

At 318 an operation for merging a first version with a second version is performed. The first version and the second version are derived from a common ancestor version. The merge operation is visually depicted in 410 of FIG. 4.

The merge operation may be performed by creating a merged set of manipulation operations by integrating manipulation operations applied to the first version with manipulation operations applied to the second version. An exemplary merge operation includes: Applying the merged set of manipulation operations to the common ancestor version. Storing in the metadata of the versioned dataset catalogue associated with the updated versioned dataset, lineage indicating derivation from the first version and the second version and the merged set of manipulation operations.

Additional details of an exemplary merge operation are now provided. The dataset versioning extension code (e.g., API) allows a user to merge any two read-accessible dataset versions (potentially created by different users) with diverged histories into a new version. The user provides the unique names of two dataset versions, e.g., LEFT and RIGHT. Optionally, the user provides a textual comment describing the rationale/purpose of the merged dataset. Essentially the operation extracts the chronologically ordered lists of defining operations, starting from the latest common ancestor of LEFT and RIGHT. If no common ancestor exists, the merge operation fails. The effect of a successful merge operation is comparable to a revision operation, using a list of manipulation operations that is generated from integrating the two previously extracted lists of operations into a common linear history and leading to creation of a new, revised dataset version, by applying the integrated list of operations to the common ancestor. The merged dataset version becomes successor of LEFT and RIGHT in the dataset version graph.

On the data level, the process is comparable to the common revision process, e.g., a storage model is selected and the new revision is either stored in a distinct or shared backing table.

On the metadata level, the difference to a revision is the resulting dataset version being marked as having two ancestors (LEFT and RIGHT) in its metadata. The list of list of defining operations (chronologically ordered list of initial query, subsequent manipulations, sampling, and shuffling instructions) of a merged dataset is defined as a suitably serialized, linear list of operations, originating from integrating two parallel branches leading to LEFT and RIGHT from their latest common ancestor. An optional user-provided textual comment documenting the revision is also recorded in the metadata.

Merging versioned dataset histories can lead to conflicts, e.g. if the schemas of LEFT and RIGHT have diverged, and requires conflict resolution (addressed later). The metadata of the merged dataset reflects the resolved, conflict free list of operations, which will serve as the new history of the merged dataset, substituting the diverged histories of the merged dataset's two ancestors LEFT and RIGHT.

On the view level, the process is comparable to a common revision process, i.e. a distinct view is created according to the chosen storage model.

The view is providing controlled reading access to the backing table by means of privileges, defined and enforced within the RDBMS. It is initially accessible only to the owner of the merged dataset, but it is grantable to other users, by means of the host RDBMS's privilege system.

Merged datasets are typically created in state 'prepared'—emphasizing that they are currently work in progress. Alternative implementations may create them in state 'published'.

At 320, an operation for changing the state of the updated dataset version is performed. A state may be assigned to the dataset version. In an exemplary implementation, dataset versions may be created in the state 'published'—emphasizing the initial dataset version's importance as a starting point for a version graph. Alternative implementations include the state 'prepared', and other states described herein.

An exemplary publish operation is now described. The dataset versioning extension code (e.g., API) allows a user to publish an existing dataset version (currently in state 'archived' or 'prepared'), which is also owned by this user. The user provides the unique name of the dataset version to be published. The publish operation is a pure metadata operation, for changing the state of a given dataset version. The 'published' state highlights datasets that are ready (e.g. datasets where data curation processes have been completed) for sharing when collaborating with other users. Data, view and privileges are unaffected by the publish operation.

An exemplary archive operation is now described. The dataset versioning extension code (e.g., API) allows a user to archive an existing dataset version (currently in state 'published' or 'prepared'), which is also owned by this user. The user provides the unique name of the dataset version to be archived. The archive operation is a pure metadata operation, for changing the state of a given dataset version. The 'archived' state highlights datasets that are obsolete (e.g. should not be used by collaborating users). Data, view and privileges are unaffected by this operation.

At 322 an operation for extracting a patch of the chronologically ordered list of applied operations is performed. The patch operation is visually depicted in 416 of FIG. 4. The user may provide the unique names of two dataset versions, e.g., START and END, where START is an ancestor of END. The result will be exposed to the user a textual list of ordered operation, e.g., for inspection and/or editing. Patches can be applied directly either for revision or for amendment of existing revisable dataset versions, by passing the patch as input parameter to the revise or amend function, respectively. Application of patches can lead to conflicts and may require conflict resolution. Patch is a pure reading operation on the metadata and does not affect data, metadata, views, privileges, or state of involved dataset versions.

At 324, a rebase operation is performed. The rebase operation is visually depicted in 418 of FIG. 4. The dataset versioning extension code (e.g., API) allows a user to rebase the history of any read-accessible dataset versions. The user may provide the unique names of three dataset versions, e.g., OLD, NEW, and HEAD, where OLD is an ancestor of HEAD. The rebase operation extracts the chronologically ordered lists of structured query operations from OLD to HEAD and applies them on NEW. The effect of a successful rebase operation is comparable to a revision operation, using a generated list of manipulation operations and leading to creation of a new, revised versioned dataset, while afterwards purging all versioned datasets from OLD (exclusive) to the original HEAD (inclusive). Rebasing dataset histories may lead to conflicts, e.g. if the schemas of OLD and NEW are different, and may require conflict resolution. The metadata of the rebased dataset reflects the resolved, conflict free list of operations.

At 326, a conflict resolution operation may be performed, for example, for resolving conflicts that may arise due to implementation of some operations described herein, for example, for addressing incompatible schema when merging two dataset histories. The conflict resolution operation may include automated conflict detection (e.g., types, arity, column names, etc.) and/or allows manual resolution by editing the patch. Semi-automated resolution policies may address conflicts when merging histories, e.g. keep existing values or overwrite values.

Referring now back to FIG. 8, dataflow 802 depicts a merge operation on text files in CSV format, leading to conflict, while dataflow 804 depicts a merge operation using relational algebra with no conflict, in accordance with some embodiments.

Referring now back to FIG. 6, at 602, a user accesses dataset versioning interface (API) 604. The user may invoke stored procedures constituting the API for supporting dataset versioning in the RDBMS. Dataset versioning interface (API) 604 provides functionality tailored for managing efficient storage, collaboration and automation on versioned datasets, for example, as described herein. The dataset versioning extension exposes a set of executable functions for managing versioned datasets. The actual user interface can be tailored for providing convenient support, e.g. for the use cases (a) deep branching, (b) flat branching, (c) science pattern, (d) data curation pattern, or other, similar use cases. The implementation of the dataset versioning extension described here may be independent from the user interface. General dataset versioning may be integrated into an RDBMS as a common and efficient approach to storage management for versioned datasets, not necessarily a particular API.

Dataset versioning extension (code) 606, provides generalized dataset versioning functionality using existing RDBMS infrastructure, for example, as described herein. Dataset versioning extension code 606 may be an extension to the host RDBMS that can be added at any moment to an existing production RDBMS for equipping the RDBMS with dataset versioning capabilities. The extension installs executable functions, i.e. code, for managing versioned datasets and creates an empty repository for storing versioned datasets. Dataset versioning repository 608 may define a namespace inside the RDBMS for storing relational data representing datasets with versioning information. Data stored within the repository is not necessarily directly accessible to RDBMS users, access may be restricted by means of the RDBMS privilege system. As all data stored inside the RDBMS, the dataset version repository integrates with the RDBMS's full recovery capabilities and identical privilege system may be used for live and versioned data.

Dataset versioning repository 608 collects, maintains and/or leverages relevant data and/or metadata on versioned dataset storage 610 and/or catalogue 612 for dataset lineage and/or for reuse in collaborative workflows with improved productivity by automation, for example, as described herein. Versioned dataset storage (data) 610 provide space-efficient storage management for complex dependencies among redundant portions of dependent versions comprised by versioned datasets, for example, as described herein.

Versioned dataset storage may include one or more backing tables, each storing versioned relational data optionally inside a conventional RDBMS, close to where the live datasets exist and evolve, e.g., as conventional relations within the RDBMS system. Backing tables are the physical representation for versioned datasets and may be managed by the dataset versioning extension code. Backing tables are defined and managed by the dataset versioning extension code. All read/write access to regular users may be revoked. Each backing table may serve for storing one or multiple versions of one single versioned dataset. Backing tables may be created from a user-supplied dataset definition in SQL (e.g. "CREATE TABLE AS SELECT < . . . >") over arbitrary combinations of live datasets and historic data from existing versioned datasets, stored within or accessible by the system, using the full expressiveness of SQL. Data types of backing table columns are derived from the input data and, if applicable, inherit additional properties from input data, like check constraints (e.g. NOT NULL), unique constraints, collation and similar column definition properties. Backing tables storing more than one dataset version also store auxiliary attributes with affiliation encodings (e.g. affiliation bitmaps), allowing the code to relate any data row within the backing table the one or more dataset versions sharing the backing table. Minimum requirements for implementing relational backing tables in a given host RDBMS may be the host system's ability to store wide tables, to dynamically add columns to existing backing tables, and to efficiently handle sparsity (areas of null values) within the backing table. Thus many implementations of relational tables are suitable. Backing tables may leverage existing storage technology for compact storage and scalable, efficient retrieval, e.g. compressed (optionally distributed) columnar storage, which also allows inexpensive addition and removal of columns in existing tables. Alternative implementations may use a given host system's cloud-native wide columnar storage (HBase/BigTable/DynamoDB, Azure Tables, Hypertables, etc.), with similar compression and flexible column management capabilities, but backed by cloud storage service of scalable throughput and abundant capacity.

Versioned dataset catalogue (metadata) 612 provides reading access for exploring available datasets in the repository, for collaboration and re-use of data and operations on versioned datasets, for example, as described herein.

Affiliation encodings may be stored in versioned dataset catalogue 612 and/or in a separate data structure. Affiliation encodings may define auxiliary columns that are stored in those backing tables that include more than one version of a particular versioned dataset. Affiliation encodings are not necessarily exposed to the user in versioned dataset views or elsewhere, they may serve for internal purposes. One exemplary implementation of affiliation encoding is the affiliation bitmap, i.e. one Boolean attribute (NOT NULL) per dataset version stored in the backing table, where the corresponding Boolean value is set to TRUE for each row that participates in the version corresponding to bitmap, resp. FALSE otherwise. Alternative implementations of affiliation encodings may use one single attribute or combinations of multiple attributes of different data types, e.g. INTEGER, BINARY, VARBINARY, VARCHAR, BOOL[ ] or INTEGER[ ], for encoding affiliation of multiple versions. The affiliation encoding is used by versioned dataset views 614 for filtering out rows that are not participating in the single version of the versioned dataset represented by this view.

Further, affiliation encodings may also define a particular order for individual dataset versions of a versioned dataset. Order may be stored in the versioned dataset catalogue 612 and/or in a separate data structure, for example, in auxiliary columns in the backing tables.

Versioned dataset views 614 provide controlled exposure of versioned datasets in the namespace of the live database, for example, as described herein. Access privileges may apply. Live datasets 616, for example, ML training datasets, production data, serving a business logic stored, may be (optionally constantly) updated by the RDBMS. Full SQL interaction of versioned data (read-only) and/or live data (read/write) may be supported. At 618, data from the live datasets may be incorporated for creation of versioned datasets, for example, as described herein. One versioned dataset view may expose one individual version of a versioned dataset as relational view. These views may be defined and managed by the dataset versioning extension code. The definition includes, for example, mapping, projection, selection, and order. Regular users may be granted read-only privileges on the views and cannot necessarily manipulate the view definition. Such view allows to access the one corresponding backing table in a controlled way. The view provides mapping of backing table columns to user column. Mapping may refer to simple mapping of column names, and/or refer to arbitrary functional combination (expressible in SQL) of one or several backing table attributes into a computed column (e.g. type casts, arithmetic, coalesce, concatenation, etc.). The view provides projection by concealing those columns of the backing table not participating in the single version of the versioned dataset represented by this view. Projection may be strictly enforced by the projection list of the immutable view definition. The view provides selection by concealing those rows of the backing table not participating in the single version of the versioned dataset represented by this view. Selection may be enforced by use of predicates on the affiliation encoding through the immutable view definition. The view provides order by enforcing a particular row-wise reading order that may be defined for individual dataset versions of a versioned dataset within the associated affiliation encoding. Such view may provide the owner (e.g., the common user that created a particular versioned dataset) of the versioned dataset with read-only privileges for accessing the immutable backing table in a controlled way. Owner's read-only privileges may be grantable, allowing the owner to share versioned datasets with other RDBMS users. The views may allow arbitrary, seamless queries and data migration across live datasets and multiple historic versioned datasets, while providing full compatibility of the type system.

Referring now back to FIG. 10, a data versioning repository 1002 may be defined and/or managed by code, optionally an add-on to an existing RDBMS, sometimes referred to herein as versioned dataset extension. Backing table $T_1$ 1004 and backing table $T_2$ 1006 may be stored with restricted and/or internal designations 1008, that deny access to common users. An exposed designation 1010 may provide read-only access to common users, which may be grantable by dataset version owners.

Backing table T1 1004 stores a single dataset version V1, for example, an initial version of the dataset. Since there is only one version, no affiliation encoding is necessarily provided. A user may be granted access to versioned dataset view 1012 of backing table T1 1004, which is generated by mapping of columns of backing table T1, without affiliation encoding and/or without a change in order.

Backing table T2 1006 stores three versions of a dataset, denoted V2, V3, and V4. Affiliation encoding 1014 is provided for V2, affiliation encoding 1016 is provided for V3, and affiliation encoding 1018 is provided for V4. Users are granted access to a view of dataset V2 1020, which is created by mapping and projection of T2 columns using selection according to affiliation encoding 1014 and/or order defined by affiliation encoding 1014. A view of dataset V3 1022 is created by mapping and projection of T2 columns using selection according to affiliation encoding 1016 and/or order defined by affiliation encoding 1016. A view of dataset V3 1024 is created by mapping and projection of T2 columns using selection according to affiliation encoding 1018 and/or order defined by affiliation encoding 1018.

Referring now back to FIG. 11, dataflow 1102 depicts an exemplary ML dataflow for preparation and/or management of multiple versions of a versioned dataset for reproducible training and testing of ML models. For example, user 1 performs data cleansing, user 2 performs a snapshot specialization, and user 3 performs a data imputation, by respective structured queries on different versions of the versioned dataset, as described herein.

In an exemplary ML process, for example, as depicted in dataflow 1102, several versions of a dataset are created from raw data by elaborate and often repetitive dataset preparation processes (e.g., data curation/cleansing/imputation) and afterwards prepared for training of a particular model (e.g., feature extraction/dataset specialization). Typically, multiple data-scientists participate in these processes and at least some embodiments described herein support such collaboration by maintaining a centralized repository of individual contributions, for encouraging sharing and re-use of existing units of work. ML datasets (e.g., an example implementation of the versioned dataset described herein) may be annotated with unique names (version tags), states (e.g. prepared, published, archived, purged) and documentation as textual comments.

In at least some embodiments, detailed records on the full lineage of every versioned dataset are maintained, from the original raw data, over all intermediate versions, including each version's defining transformation with respect to its immediate predecessors, to its preset state. The full lineage provides for reproducible model training and/or provides data provenance for trained ML models by maintaining training dataset as effectively immutable.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant RDBMS will be developed and the scope of the term RDBMS is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for managing a versioned dataset, comprising:
   a processor; and
   a non-transitory storage medium having processor-executable instructions stored thereon;
   wherein the processor-executable instructions, when executed by the processor, facilitate performance of the following by the apparatus:
   receiving at least one structured query indicating instructions for manipulating data of a specific version, wherein the specific version is out of a plurality of versions comprised by the versioned dataset, and wherein the versioned dataset is stored in a backing dataset;
   creating, in the backing dataset, an updated versioned dataset by applying the at least one structured query to the specific version;
   storing the updated versioned dataset in the backing dataset, wherein data of the plurality of versions including the specific version remain unchanged, wherein the updated versioned dataset stores an incremental change relative to the specific version, wherein the incremental change corresponds to the application of the at least one structured query, and wherein the updated versioned dataset does not include a redundant copy of data of the specific version unaffected by the incremental change;
   updating a versioned dataset catalog to include in association with the updated dataset version, the at least one structured query and lineage indicating that the updated versioned dataset includes a successor of the specific version, wherein the versioned dataset catalog includes historical chronologically applied structured queries and lineage for each of the plurality of versions;
   updating an affiliation encoding associated with the updated versioned dataset indicating which data of the updated versioned dataset matches data of the specific version and which data of the updated versioned dataset is deleted relative to data of the specific version; and
   generating a database view of the updated versioned dataset by selecting rows and projecting columns of the backing dataset corresponding to the updated versioned dataset according to the affiliation encoding.

2. The apparatus of claim 1, wherein the backing dataset is implemented as a table including rows and columns, wherein an original version of the versioned dataset is stored in its entirety, wherein subsequent versions of the versioned dataset are stored as incremental manipulations to preceding versions by storing incremental rows and/or columns and by storing an indication of manipulations to the preceding versions in metadata of the versioned dataset catalog associated with the subsequent versions.

3. The apparatus of claim 1, wherein the backing dataset comprises a single backing dataset that stores the plurality of versions of the versioned dataset.

4. The apparatus of claim 3, further comprising information for compressing the single backing dataset including default values indicating deleted data.

5. The apparatus of claim 1, wherein the affiliation encoding indicates which rows and/or columns of the updated versioned dataset match rows and/or columns of the specific version and which rows and/or columns of the updated versioned dataset are deletions relative to the specific version.

6. The apparatus of claim 5, wherein the affiliation encoding is implemented as a bitmap, wherein in response to a new row and/or column being added to the updated versioned dataset, the affiliation encoding bitmap includes Boolean values for each respective row set to TRUE in response to that respective row participating in the updated versioned dataset and to FALSE otherwise.

7. The apparatus of claim 1, wherein the backing dataset stores a plurality of default values indicating a mapping to values stored in a preceding version.

8. The apparatus of claim 1, wherein the information refers to a code comprising an add-on extension and/or an application programming interface (API) connected to a relational database management system (RDBMS) that manages the versioned dataset.

9. The apparatus of claim 1, wherein metadata stored in the versioned dataset catalog is shared and readable by a plurality of users designated with access to the versioned dataset, and wherein concurrent operations for creating and/or revising the plurality of versions of the versioned dataset requested by the plurality of users on the versioned dataset are encapsulated as transactions.

10. The apparatus of claim 1, wherein the lineage of a respective version stored in the versioned dataset catalog denotes dependencies between the plurality of versions of the versioned dataset and is selected from a group consisting of:
    a direct ancestor of the respective version,
    one of multiple ancestors to a preceding version,
    a root ancestor indicating a first version with no preceding versions, and
    a direct ancestor of two or more versions that are merged.

11. The apparatus of claim 1, wherein the database view stores a mapping indicating a calculation of columns and/or rows of the updated versioned dataset from columns and/or rows of one or more preceding versions, and wherein the database view of the updated versioned dataset defines instructions for applying the calculations to the columns and/or rows of the one or more preceding versions according to the mapping.

12. The apparatus of claim 11, wherein the calculation includes one or more members selected from a group consisting of: renaming, negation, type cast, addition, concatenation, coalesce, arbitrary unary and n-ary mappings available in a relational database management system (RDBMS), and user-defined mappings.

13. The apparatus of claim 1, wherein the processor-executable instructions, when executed by the processor, further facilitate performance of the following by the apparatus:
    re-executing the historical chronologically applied structured queries stored in the versioned dataset catalog for creating an updated version of the specific version of the plurality of versions of the versioned dataset from current live data;
    storing the updated version in the versioned dataset; and
    updating the versioned dataset catalog with an indication of the lineage and re-execution for the updated version.

14. The apparatus of claim 1, wherein the at least one structured query includes instructions for inserting a new row and/or new column into the specific version, the backing dataset is updated to include the new row and/or new column, and the affiliation encoding is updated to indicate that the new row and/or new column are associated with the updated versioned dataset, wherein the new row and/or new column are un-associated with other versions.

15. The apparatus of claim 14, wherein the database view of the updated versioned dataset created by the selecting of rows and the projecting of columns of the backing dataset corresponding to the updated versioned dataset includes the new row and/or new column.

16. The apparatus of claim 1, wherein the at least one structured query includes instructions for deleting a row and/or column from the specific version and the versioned dataset catalog is updated to indicate that the row and/or column of the specific version is excluded from the updated versioned dataset, wherein the row and/or column is non-deleted in the backing dataset and the affiliation encoding is updated to indicate that the deleted row and/or deleted column is un-associated with the updated versioned dataset, and wherein the deleted row and/or deleted column remains associated with other versions.

17. The apparatus of claim 16, wherein the database view of the updated versioned dataset created by selecting rows and projecting columns of the backing dataset corresponding to the updated versioned dataset excludes the deleted row and/or column.

18. The apparatus of claim 1, wherein the at least one structured query includes instructions for:
changing values in a row and/or column for the specific version,
copying the row and/or column affected by the changing of the value,
updating the backing dataset to include the copy,
performing the changing of the value on the copy, and
updating the affiliation encoding to indicate that the copy with changing of the value is associated with the updated versioned dataset, wherein the copy with the changing of the value is un-associated with other versions.

19. The apparatus of claim 1, wherein the at least one structured query corresponds to an instruction to add an additional row to the specific version, and wherein the updated versioned dataset includes the additional row while not including any other rows of the specific version.

20. The apparatus of claim 1, wherein the at least one structured query corresponds to an instruction to rearrange rows of data of the specific version into a new order, wherein the updated versioned dataset does not include the rearranged rows of data, and wherein the affiliation encoding associated with the updated versioned dataset stores the new order.

21. A method for managing a versioned dataset, comprising:
receiving, by an apparatus, at least one structured query indicating instructions for manipulating data of a specific version, wherein the specific version is out of a plurality of versions comprised by the versioned dataset, and wherein the versioned dataset is stored in a backing dataset;
creating, by the apparatus, in the backing dataset, an updated versioned dataset by applying the at least one structured query to the specific version;
storing, by the apparatus, the updated versioned dataset in the backing dataset, wherein data of the plurality of versions including the specific version remain unchanged, wherein the updated versioned dataset stores an incremental change relative to the specific version, wherein the incremental change corresponds to the application of the at least one structured query, and wherein the updated versioned dataset does not include a redundant copy of data of the specific version unaffected by the incremental change;
updating, by the apparatus, a versioned dataset catalog to include in association with the updated dataset version, the at least one structured query and lineage indicating that the updated versioned dataset includes a successor of the specific version, wherein the versioned dataset catalog includes historical chronologically applied structured queries and lineage for each of the plurality of versions;
updating, by the apparatus, an affiliation encoding associated with the updated versioned dataset indicating which data of the updated versioned dataset matches data of the specific version and which data of the updated versioned dataset is deleted relative to data of the specific version; and
generating, by the apparatus, a database view of the updated versioned dataset by selecting rows and projecting columns of the backing dataset corresponding to the updated versioned dataset according to the affiliation encoding.

22. A non-transitory computer-readable medium having processor-executable instructions stored thereon, wherein the processor-executable instructions, when executed, facilitate performance of the following:
receiving at least one structured query indicating instructions for manipulating data of a specific version, wherein the specific version is out of a plurality of versions comprised by the versioned dataset, and wherein the versioned dataset is stored in a backing dataset;
creating, in the backing dataset, an updated versioned dataset by applying the at least one structured query to the specific version;
storing the updated versioned dataset in the backing dataset, wherein data of the plurality of versions including the specific version remain unchanged, wherein the updated versioned dataset stores an incremental change relative to the specific version, wherein the incremental change corresponds to the application of the at least one structured query, and wherein the updated versioned dataset does not include a redundant copy of data of the specific version unaffected by the incremental change;
updating a versioned dataset catalog to include in association with the updated dataset version, the at least one structured query and lineage indicating that the updated versioned dataset includes a successor of the specific version, wherein the versioned dataset catalog includes historical chronologically applied structured queries and lineage for each of the plurality of versions;
updating an affiliation encoding associated with the updated versioned dataset indicating which data of the updated versioned dataset matches data of the specific version and which data of the updated versioned dataset is deleted relative to data of the specific version; and
generating a database view of the updated versioned dataset by selecting rows and projecting columns of the backing dataset corresponding to the updated versioned dataset according to the affiliation encoding.

* * * * *